US011195033B2

(12) United States Patent
Creusot et al.

(10) Patent No.: US 11,195,033 B2
(45) Date of Patent: Dec. 7, 2021

(54) MULTI-MODAL, MULTI-TECHNIQUE VEHICLE SIGNAL DETECTION

(71) Applicant: GM Cruise Holdings LLC, San Francisco, CA (US)

(72) Inventors: Clement Creusot, San Francisco, CA (US); Divya Thuremella, San Francisco, CA (US); Na Yu, San Jose, CA (US); Jia Pu, Mountain View, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 11 days.

(21) Appl. No.: 16/803,829

(22) Filed: Feb. 27, 2020

(65) Prior Publication Data
US 2021/0271905 A1  Sep. 2, 2021

(51) Int. Cl.
| | | |
|---|---|---|
| *G06K 9/46* | (2006.01) | |
| *G08G 1/16* | (2006.01) | |
| *B60W 30/09* | (2012.01) | |
| *G06K 9/32* | (2006.01) | |
| *G06K 9/62* | (2006.01) | |
| *G06K 9/00* | (2006.01) | |

(52) U.S. Cl.
CPC ......... *G06K 9/00825* (2013.01); *B60W 30/09* (2013.01); *G06K 9/00208* (2013.01); *G06K 9/00805* (2013.01); *G06K 9/3233* (2013.01); *G06K 9/4652* (2013.01); *G06K 9/6267* (2013.01); *G06K 9/6288* (2013.01); *G08G 1/166* (2013.01)

(58) Field of Classification Search
CPC combination set(s) only.
See application file for complete search history.

(56) References Cited

U.S. PATENT DOCUMENTS

| | | | |
|---|---|---|---|
| 5,193,124 | A | 3/1993 | Subbarao |
| 7,136,524 | B1 | 11/2006 | Goh et al. |
| 8,238,612 | B2 | 8/2012 | Susca et al. |
| 9,272,709 | B2 | 3/2016 | Shalom |

(Continued)

OTHER PUBLICATIONS

Gang Li, "Application of Image Processing and Three-Dimensional Data Reconstruction Algorithm Based on Traffic Video in Vehicle ComponeGang Li, Application of Imt Detection", Nov. 15, 2017, Hindawi, Mathematical Problems in Engineering vol. 2017, Article ID 4145625, https://doi.org/10.1155/2017/4145625,pp. 1-15.*

(Continued)

*Primary Examiner* — Omar S Ismail
(74) *Attorney, Agent, or Firm* — Patent Capital Group

(57) ABSTRACT

A vehicle includes one or more cameras that capture a plurality of two-dimensional images of a three-dimensional object. A light detector and/or a semantic classifier search within those images for lights of the three-dimensional object. A vehicle signal detection module fuses information from the light detector and/or the semantic classifier to produce a semantic meaning for the lights. The vehicle can be controlled based on the semantic meaning. Further, the vehicle can include a depth sensor and an object projector. The object projector can determine regions of interest within the two-dimensional images, based on the depth sensor. The light detector and/or the semantic classifier can use these regions of interest to efficiently perform the search for the lights.

20 Claims, 11 Drawing Sheets

(56) References Cited

U.S. PATENT DOCUMENTS

| | | | |
|---|---|---|---|
| 9,305,223 B1 | 4/2016 | Ogale et al. | |
| 9,305,463 B1 | 4/2016 | Yellambalase | |
| 9,317,757 B2 | 4/2016 | Winter et al. | |
| 10,061,322 B1 | 8/2018 | Palefsky-Smith | |
| 10,163,017 B2 | 12/2018 | Minster | |
| 2005/0036660 A1 | 2/2005 | Otsuka et al. | |
| 2008/0062010 A1 | 3/2008 | Kobayashi et al. | |
| 2009/0112389 A1 | 4/2009 | Yamamoto et al. | |
| 2010/0073753 A1 | 3/2010 | Kimura | |
| 2013/0083971 A1 | 4/2013 | Du et al. | |
| 2013/0121529 A1 | 5/2013 | Fleisher et al. | |
| 2013/0129150 A1 | 5/2013 | Saito | |
| 2015/0210277 A1 | 7/2015 | Shalom | |
| 2015/0268058 A1* | 9/2015 | Samarasekera | G08G 5/0073 701/409 |
| 2016/0267358 A1 | 9/2016 | Shoaib et al. | |
| 2017/0076463 A1 | 3/2017 | Nishijima | |
| 2017/0242436 A1 | 8/2017 | Creusot | |
| 2018/0165500 A1 | 6/2018 | Glickman et al. | |
| 2018/0173971 A1 | 6/2018 | Jia et al. | |
| 2018/0247138 A1 | 8/2018 | Kang | |
| 2018/0307925 A1 | 10/2018 | Wisniowski et al. | |
| 2018/0365888 A1* | 12/2018 | Satzoda | G06K 9/00791 |
| 2019/0050625 A1 | 2/2019 | Reinstein et al. | |
| 2019/0092318 A1 | 3/2019 | Mei et al. | |
| 2019/0096086 A1* | 3/2019 | Xu | G06T 7/60 |
| 2019/0302259 A1* | 10/2019 | Van Fleet | G01S 17/86 |
| 2019/0311546 A1* | 10/2019 | Tay | G06T 19/006 |
| 2019/0315274 A1 | 10/2019 | Mehdi et al. | |
| 2020/0026283 A1 | 1/2020 | Barnes et al. | |
| 2020/0026960 A1 | 1/2020 | Park et al. | |
| 2020/0042809 A1 | 2/2020 | Heift et al. | |
| 2020/0160126 A1 | 5/2020 | Malach et al. | |
| 2020/0160559 A1* | 5/2020 | Urtasun | G06K 9/629 |
| 2020/0284913 A1 | 9/2020 | Amelot et al. | |
| 2020/0294257 A1 | 9/2020 | Yoo et al. | |
| 2020/0327343 A1* | 10/2020 | Lund | G06T 7/70 |
| 2020/0393845 A1* | 12/2020 | Wang | G06K 9/00791 |
| 2020/0412940 A1 | 12/2020 | Huang | |
| 2021/0027417 A1 | 1/2021 | Karrman et al. | |
| 2021/0094538 A1* | 4/2021 | Beller | B60W 40/04 |

OTHER PUBLICATIONS

Guangtao Cheng, "A vehicle detection approach based on multi-features fusion in the fisheye images", May 5, 2011, 2011 3rd International Conference on Computer Research and Development, DOI:10.1109/ICCRD.2011.5763840, pp. 1-4.*

USPTO Non-Final Office Action issued in U.S. Appl. No. 16/804,667 dated Jan. 4, 2021; 18 pages.

PCT International Search Report and Written Opinion issued in PCT/US2020/061703 dated Mar. 10, 2021; 13 pages.

PCT International Search Report and Written Opinion issued in PCT/US2020/061727 dated Mar. 3, 2021; 12 pages.

USPTO Final Office Action issued in U.S. Appl. No. 16/804,667 dated Jul. 9, 2021; 42 pages.

* cited by examiner

MULTI-MODAL, MULTI-TECHNIQUE VEHICLE SIGNAL DETECTION

TECHNICAL FIELD

The present disclosure relates generally to detecting vehicle signals in images from one or more cameras mounted on a vehicle.

BACKGROUND

Some vehicles can sense the environment in which they drive, using a camera, and sensors, such as Light Detection and Ranging (LIDAR) and radar. The camera can capture images of objects in the environment. The LIDAR and radar sensors can detect depths of the objects in the environment.

Some vehicles are autonomous vehicles (AVs) that drive in their environment independently of human supervision. These AVs can include systems that detect signal lights of a vehicle within images from the camera. In these systems, an entirety of an image obtained from the camera is searched for the signal lights. This search is computationally intensive and expensive, which makes the search slow and very time-consuming for a vehicle traveling at road speeds.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Introduction

Figure 1:
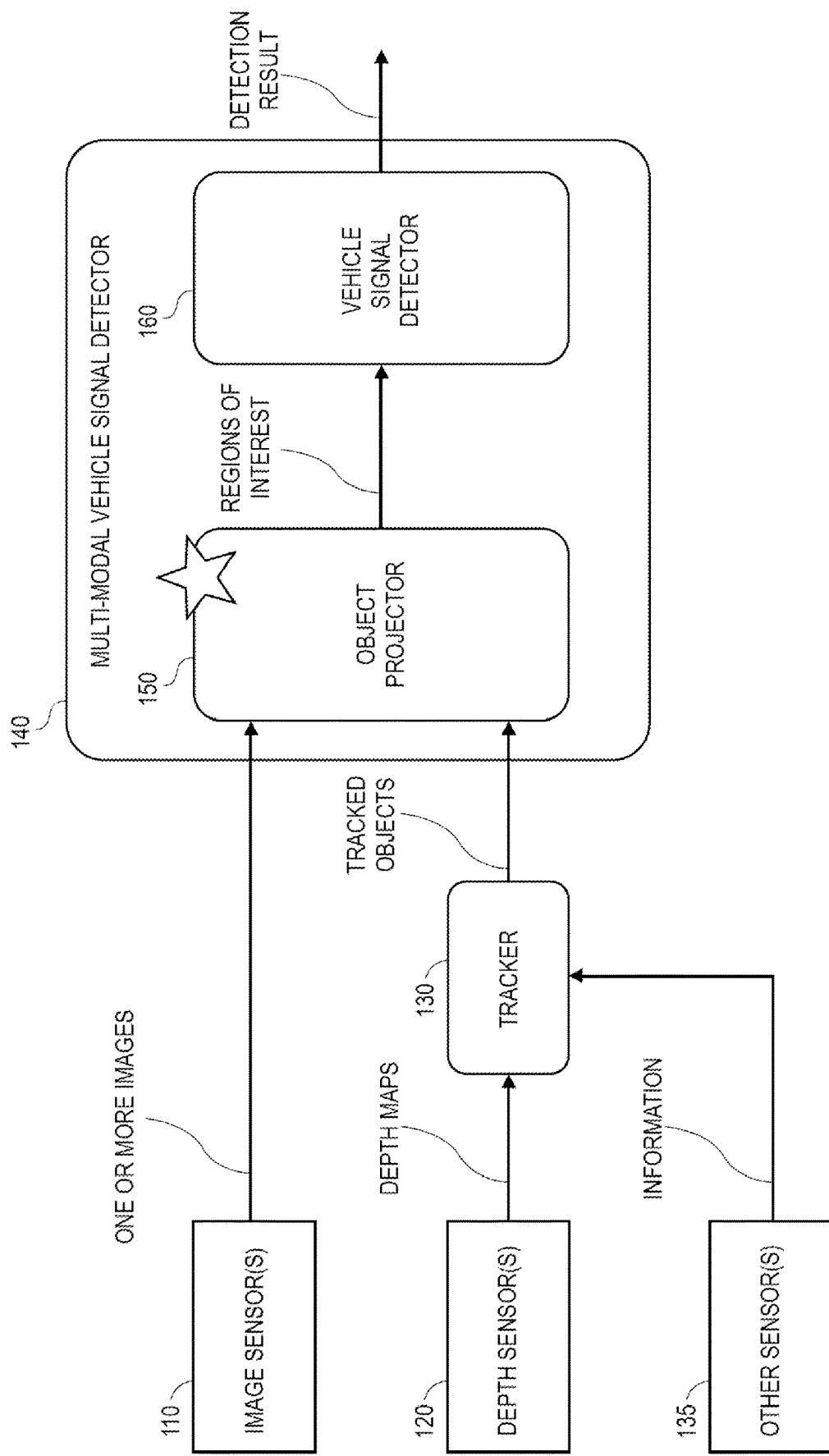
FIG. 1 is a block diagram illustrating a multi-modal vehicle signal detector in accordance with various implementations of the present disclosure.

A depth sensor and/or camera mounted on a body of a vehicle can detect a position of an object in an environment surrounding the vehicle. An object tracker, performing object detection and tracking based on information from depth sensor and/or camera, can represent an object as a polygon or box. An object tracker may also identify objects as vehicles. The object trackers can determine and provide information relating to a position of an object, orientation of the object, and the size of the object (e.g., represented as a three-dimensional box). The information can be provided by the object tracker in the coordinate system of the object tracker. The detected position of the object can be used to identify a subsection of an image from the camera that includes the object. Thus, a search for a vehicle signal on the object can be limited to the subsection of the image. The subsection of the image is referred herein as region of interest. By limiting the search to a region of interest, the search for vehicle signals can be more efficient. Moreover, the search for vehicle signals can be more robust when performed with information from the object tracker, since there is a higher degree of certainty that the identified vehicle signals are indeed signals on a vehicle, and not on other types of objects such as street lights and traffic lights. A search can be made more efficient by focusing the search on the front and rear faces of the vehicle or on the outer portions of the sides of the vehicles. In some cases, the search can leverage information from the object tracker and information about where the vehicle signals are likely to be located to optimize the search for vehicle signals in the image from the camera.

In some embodiments of the present disclosure, a system maintains information that relates pixels of images captured by a camera to coordinate system of the object tracker. This information can be represented as a geometric matrix transformation that can transform information in the coordinate system of the object tracker to the coordinate system of the camera. Specifically, the geometric matrix transformation can transform information in the coordinate system of the object tracker to pixels of an image captured by the camera. The system receives, from the object tracker, three-dimensional coordinates of a vehicle in an environment surrounding the camera. The object tracker of the system can represent the vehicle as a three-dimensional box, based on information such as the three-dimensional coordinates of the object. Through a geometric matrix transformation, the system can project the three-dimensional coordinates of the box onto the two-dimensional image captured by the camera. In some cases, the system can project a face of the three-dimensional box (e.g., a vehicle side) onto the two-dimensional image captured by the camera. The system can then determine a region of interest (ROI) for the vehicle in an image captured by the camera, based on the projection, and optionally other information from the object tracker. The system can then search for lights of the vehicle within the ROI.

In implementations in which the box has unequal faces (as distinguished from the equal faces of a cube), an object tracker of the system can maintain a sense of the smaller length of the front and rear faces of the vehicle and the longer length of the sides of the vehicle. Thus, the system, leveraging information from the object tracker, can perform a more efficient and more robust search for lights. Having a box representation for vehicles and identifying regions of interest to search for lights, mean that other sources of lights which are not vehicle signal lights (e.g., street lights, traffic lights, reflections of vehicle signal lights, etc.) can be excluded. The system can effectively reduce false positives triggered by the other sources of lights which are not vehicle signal lights.

In addition, issues can arise if only one image is searched for a vehicle signal. For example, if a portion of the object is temporarily occluded by another object, then an image from the camera will not include a light within the occluded portion of the object. Similarly, if a portion of the object is not within the field-of-view of the camera, then an image from the camera will not include any light outside the field-of-view of a camera. Other issues can arise due to the exposure setting of a given camera, in the absence of any type of occlusion issues. A vehicle signal may be visible from one camera having a fixed exposure, but the same vehicle signal may not be detectable from another camera having automatic exposure, or vice versa.

In some embodiments, a system in one implementation of the present disclosure includes multiple cameras that capture two-dimensional images of an object from different positions and detect one or more lights of the object within the images. Accordingly, the system can detect a light of the object in an image from one camera, even if the light is occluded, or not present, in an image from another camera.

Further, in one situation, a camera might capture an image of just the left light of an object, and another camera might capture an image of just the right light of the object. In this situation, fusing information of the two images can provide additional information that cannot be derived from just one of the images alone. For example, the system can semantically interpret an image of just the left light or an image of just the right light as indicating the possibility that a turn signal is ON or a hazard light is ON. By fusing information of the two images, the system can semantically determine that both lights are ON and, therefore, the hazard lights are ON and the turn signals are OFF. Thus, the system can more accurately control an autonomous vehicle based on the clearer semantic meaning.

In some embodiments, a system in one implementation of the present disclosure includes multiple cameras, with different exposure settings, which capture two-dimensional images of an object. Based on the images from multiple cameras, the system can detect one or more lights of the object within the images. Accordingly, the system can detect a light of the object in an image from one camera, even if the light is not detectable in an image from another camera.

In some implementations, different techniques for detecting vehicle lights can be applied to one or more images, possibly by the same, or by different cameras. Interpretation of vehicle signal detection results (e.g., semantic meanings) from the different techniques can improve robustness, and be more accurate than a system involving a single technique.

Overview of Selected Features

FIG. 1 is a block diagram illustrating a multi-modal vehicle signal detector in accordance with an implementation. The system of FIG. 1 includes one or more image sensor(s) 110, one or more depth sensor(s) 120, a tracker 130, optional one or more other sensor(s) 135, the multi-modal vehicle signal detector 140, an object projector 150, and a vehicle signal detector 160. The multi-modal vehicle signal detector 140 can be included in a vehicle, such as the AV discussed with regard to FIG. 3.

The one or more image sensor(s) 110 can include one or more camera(s) mounted on the vehicle. The one or more image sensor(s) 110 capture two-dimensional images of an environment through which the vehicle drives. The one or more image sensor(s) 110 output one or more of the two-dimensional images to multi-modal vehicle signal detector 140.

The one or more depth sensor(s) 120 are or include one or more LIDAR sensor(s) and/or one or more radar sensors mounted on the vehicle. The one or more depth sensor(s) 120 determine distances between the one or more depth sensor(s) 120 and objects in the environment through which the vehicle drives. The one or more depth sensor(s) 120 output to the tracker 130 depth maps indicating the depths from the one or more depth sensor(s) 120 to locations of the objects in the environment. Thus, the tracker 130 can produce three-dimensional coordinates of the objects in the environment.

The optional one or more other sensor(s) 135 can include a compass, speedometer, a global positioning system (GPS) sensor, an accelerometer, and/or any other sensor. The optional other sensor(s) 135 output information to tracker 130. Namely, the compass can output which direction the vehicle is facing (e.g., a heading). The speedometer can output a speed of the vehicle. Thus, the compass and speedometer can collectively output a velocity. The GPS sensor can output a current location of the vehicle. The accelerometer can output an acceleration of the vehicle. The optional one or more other sensor(s) 135 can also include sensors used in vehicle-to-vehicle communication.

The tracker 130 receives the depth maps from the one or more depth sensor(s) 120. The tracker 130 can also receive information (e.g., a heading, a speed, a velocity, a location, or an acceleration of the vehicle) from the optional one or more other sensor(s) 135. In some cases, the tracker 130 can receive images captured by the one or more image sensor(s) 110. The tracker 130 can output position information, orientation information, and size information associated with one or more objects in the environment. The tracker 130 can also output a classification of an object, such as identification that the object is a vehicle, or a specific type of vehicle. The tracker 130 can assign a unique identifier (e.g., a number) to each of the objects in the environment. The tracker 130 can track the distance of each object over time as the vehicle travels through the environment, and can take into account the velocity or acceleration of the vehicle if desired. The tracker 130 can determine the position, the velocity, and the acceleration of the objects in the environment. The tracker 130 can form polygons of objects in the environment. The tracker 130 can output to the multi-modal vehicle signal detector 140 the tracked objects, as represented by, e.g., their unique identifier, position, polygon, velocity, and/or acceleration. In some implementations, the tracker 130 detects objects based on signal processing techniques. In some implementation, the tracker 130 can detect objects based on artificial intelligence, e.g., by providing depth information and/or images to convolutional neural networks ("ConvNets"), such as Google TensorFlow.

In an example in which the object is a vehicle (e.g., car or truck), the tracker 130 can represent a front face of the box based on the windshield, hood, grille, and/or front bumper of the vehicle. The tracker 130 can represent a rear face of the box based on the rear windshield, trunk/tailgate, spoiler (where applicable), and/or rear bumper of the vehicle. The tracker 130 can represent a side face of the box based on the windows, doors, side panels, and/or tires of the vehicle. The tracker 130 can indicate to the object projector 150 information relating the three-dimensional box to the specific faces of a vehicle. In some implementations, the tracker 130 positions the front face of the box based on the three-dimensional coordinates of the grille and the rear face of the box based on the three-dimensional coordinates of the tailgate. The grille and tailgate more closely approximate the location of the vehicle's lights than, e.g., the windshield and the rear windshield, which may be horizontally offset or otherwise slope toward the position of the vehicle's lights. Similarly, in some implementations, the tracker 130 positions the side faces of the box based on the three-dimensional coordinates of the side panels of the vehicle.

The object projector 150 of the multi-modal vehicle signal detector 140 receives the one or more image(s) from the one or more image sensor(s) 110 and the tracked objects from the tracker 130. In some implementations, the object projector 150 also receives timestamps at which the two-dimensional images were captured by the one or more image sensor(s) 110. The information from the tracker 130 provided to the object projector 150 can include information associated with one or more objects (e.g., a vehicle) in the environment, each object represented as a three-dimensional box. The object projector 150 can apply a transform (e.g., geometric matrix transform) to project the three-dimensional box onto a two-dimensional image.

Accordingly, the object projector 150 can determine a two-dimensional view of the three-dimensional box within a two-dimensional image captured by the one or more image sensor(s) 110. In some cases, the object projector 150 can determine a two-dimensional view of a side of the three-dimensional box within the two-dimensional image captured by captured by the one or more image sensor(s) 110. In addition, because the object projector 150 projects multiple objects, the object projector 150 can also determine, through occlusion reasoning, an occlusion of part, or an entirety of a first one of the objects, due to a second one of the objects.

In some implementations, the object projector 150 can correct the two-dimensional view of the three-dimensional box based on the field-of-view of the one or more image sensor(s) 110. This correction can be performed in view of imperfections, such as aberration, in a lens of the one or more image sensor(s) 110.

The object projector 150, thus, based on the projection, determines a ROI in an image from the one or more image sensor(s) 110. The object projector 150 can determine the ROI based on the two-dimensional view of the three-dimensional box. Thus, the ROI represents where the object projector 150 expects the object to be in the image. The object projector 150 outputs the ROI as an output. In some implementations, the object projector 150 can also output a timestamp of the image including the ROI.

The vehicle signal detector 160 then efficiently searches for lights of the object within the ROI.

Figure 2:
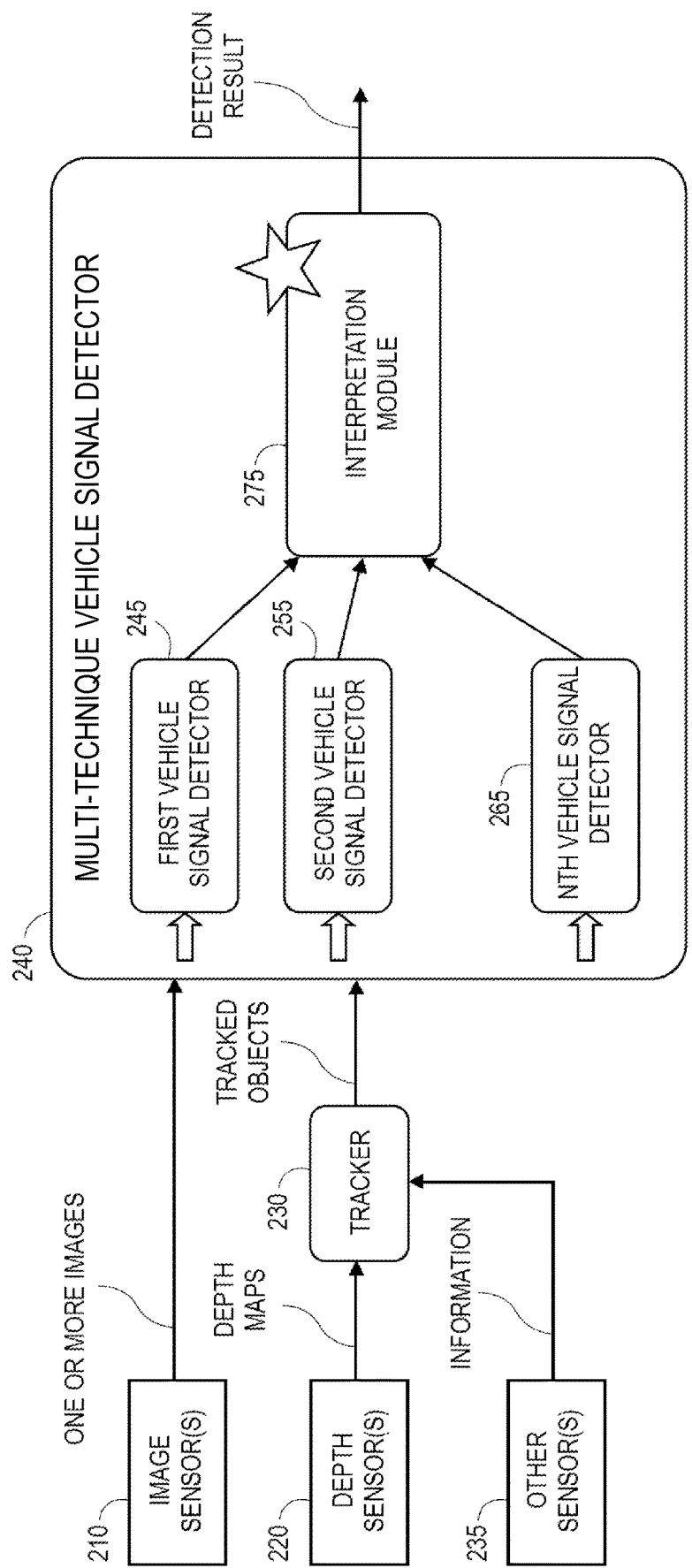
FIG. 2 is a block diagram illustrating a multi-technique vehicle signal detector in accordance with various implementations of the present disclosure.

FIG. 2 is a block diagram illustrating a multi-technique vehicle signal detector 240 in accordance with an implementation. The system of FIG. 2 includes one or more image sensor(s) 210, one or more depth sensor(s) 220, a tracker 230, optional one or more other sensor(s) 235, the multi-technique vehicle signal detector 240, one or more vehicle signal detector(s), and an interpretation module 275. The one or more vehicle signal detector(s) can include a first vehicle signal detector 245, an optional second vehicle signal detector 255, through an optional Nth vehicle signal detector 265. Preferably, the multi-technique vehicle signal detector 240 includes two or more vehicle signal detectors.

The one or more image sensor(s) 210, one or more depth sensor(s) 220, tracker 230, and optional one or more other sensor(s) 235 are structurally and functionally similar or identical to the one or more image sensor(s) 110, one or more depth sensor(s) 120, tracker 130, and optional one or more other sensor(s) 135, respectively. Thus, no further description of the one or more image sensor(s) 210, one or more depth sensor(s) 220, tracker 230, and optional one or more other sensor(s) 235 is provided for the purposes of this overview.

The one or more vehicle signal detector(s) receive two-dimensional images from the image sensor(s) 210, the tracked objects from tracker 230, and, optionally, information from the optional one or more sensor(s) 235. In some implementations, the one or more vehicle signal detector(s) also receive timestamps at which the two-dimensional images were captured by the one or more image sensor(s) 210.

The one or more vehicle signal detector(s) can be one signal detector, such as the first vehicle signal detector 245, and detect signals in images from all of the one or more image sensor(s) 210. The one or more vehicle signal detector(s) alternatively can include N vehicle signal detectors, with one of the N vehicle signal detectors detecting signals in images from one of N image sensors.

In the case where there are a plurality of vehicle signal detectors, the vehicle signal detectors can receive the same inputs but may implement different techniques involving geometric and/or semantic determinations. The vehicle signal detectors may individually receive different inputs but implement same or similar techniques involving geometric and/or semantic determinations.

The one or more vehicle signal detector(s) search for lights within the received two-dimensional image(s). The search can be based on, for example, a minimum bounding box of a light in an image, a color of the light in the image, and an average intensity of pixels of the light in the image.

After the one or more vehicle signal detector(s) detect the light, the one or more vehicle signal detector(s) make a geometric or semantic determination based on the light. In an example of a geometric determination, the one or more vehicle signal detector(s) determine a position of the light on the three-dimensional box, a color of the light, a shape of the light, and a size of the light. In an example of a semantic determination, the one or more vehicle signal detector(s) determines a meaning of the light, such as "headlight ON."

The one or more vehicle signal detector(s) output the determined geometric (e.g., position, color, shape, size) or semantic (e.g., headlight ON) information to the interpretation module 275. In some implementations, the one or more vehicle signal detector(s) also output the object identifiers and/or a three-dimensional box or cube representing the object and including representations of the lights.

The interpretation module 275 receives and fuses the determined information from the one or more vehicle signal detector(s) and performs a (final) semantic determination on the signals. The interpretation module 275 outputs this semantic determination as a (final) detection result. A vehicle including the multi-technique vehicle signal detector can be controlled based on this semantic meaning.

According to some embodiments, the interpretation module 275 can fuse geometric or semantic information from a plurality of vehicle signal detectors operating on different images from a plurality of cameras. In some cases, the interpretation module 275 can perform such fusion based on the object identifiers and/or the received three-dimensional boxes or cubes. Thus, even if a light is partially occluded or not present in an image from one camera, the system can perform reasoning to deduce a semantic detection result.

According to some embodiments, the interpretation module 275 can output a (final) semantic detection result based on outputs generated by a plurality of vehicle signal detectors applying different techniques on the same image. Thus, even if a vehicle signal light is not detectable by one technique, another vehicle signal detector may detect a vehicle signal light. In some cases, multiple results from the different techniques are fused, e.g., in a voting scheme, to increase the robustness of the multi-technique vehicle signal detector 240.

In some implementations, the multi-modal vehicle signal detector 140 of FIG. 1 can be combined with the multi-technique vehicle signal detector 240 of FIG. 2. For instance, the multi-modal vehicle signal detector 140 of FIG. 1 can be used as a vehicle signal detector within multi-technique vehicle signal detector 240 of FIG. 2.

Autonomous Vehicle

Figure 3:
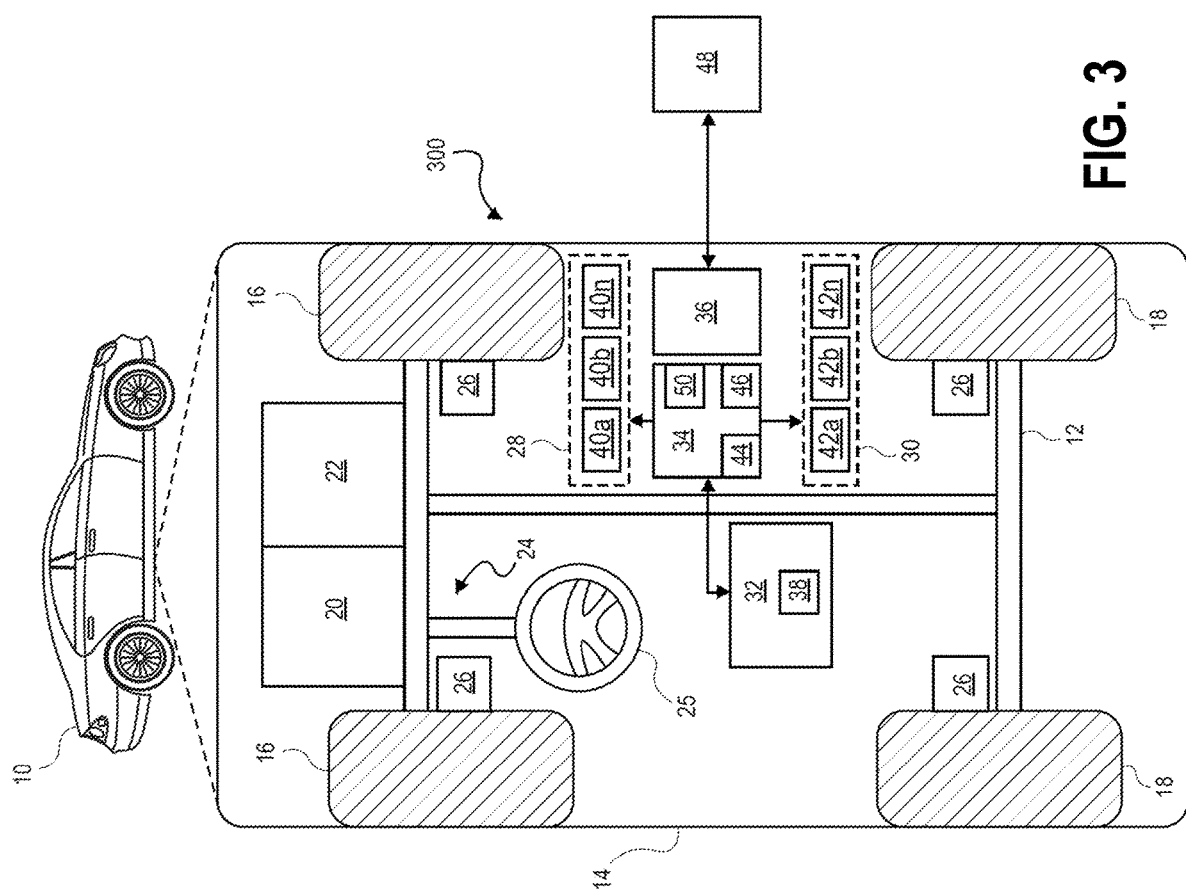
FIG. 3 is a functional block diagram illustrating an autonomous vehicle having multi-modal and/or multi-technique vehicle signal detection, in accordance with various implementations of the present disclosure.

FIG. 3 illustrates is a functional block diagram illustrating an AV having multi-modal and/or multi-technique vehicle signal detection, in accordance with various implementations.

As depicted in FIG. 3, the autonomous vehicle 10 generally includes a chassis 12, a body 14, front wheels 16, and rear wheels 18. The body 14 is arranged on the chassis 12 and encloses components of the autonomous vehicle 10. The body 14 and the chassis 12 can jointly form a frame. The front wheels 16 and rear wheels 18 are rotationally coupled to the chassis 12 near respective corners of the body 14.

In various implementations, system 300, and/or components thereof, are incorporated into the autonomous vehicle 10. The autonomous vehicle 10 is, for example, a vehicle controlled to carry passengers from one location to another, independent of human intervention. The autonomous vehicle 10 is depicted in FIG. 3 as a passenger car; any other vehicle, including a motorcycle, truck, sport utility vehicle (SUV), recreational vehicle (RV), marine vessel, aircraft, and the like, can also be used.

In an example, the autonomous vehicle 10 implements a level four or level five automation system under the Society of Automotive Engineers (SAE) "J3016" standard taxonomy of automated driving levels. Using this terminology, a level four system indicates "high automation," referring to a driving mode in which the automated driving system performs aspects of the dynamic driving task, even if a human driver does not respond appropriately to a request to intervene. A level five system indicates "full automation," referring to a driving mode in which the automated driving system performs aspects of the dynamic driving task under extreme roadway and environmental conditions managed by a human driver. Implementations are not limited to any taxonomy or rubric of automation categories. Further, systems in accordance with the present disclosure can be used in conjunction with any autonomous or other vehicle that utilizes a navigation system and/or other systems to provide route guidance and/or route implementation.

As shown, the autonomous vehicle 10 generally includes a propulsion system 20, a transmission system 22, a steering system 24, a brake system 26, a sensor system 28, an actuator system 30, a data storage device 32, at least one controller 34, and a communication system 36. The propulsion system 20 can, in various implementations, include an internal combustion engine, an electric machine such as a traction motor, and/or a fuel cell propulsion system. The transmission system 22 transmits power from the propulsion system 20 to the front wheels 16 and the rear wheels 18 according to selectable speed ratios. According to various implementations, the transmission system 22 can include a step-ratio automatic transmission, a continuously-variable transmission, or other appropriate transmission.

The brake system 26 provides braking torque to the front wheels 16 and/or the rear wheels 18. Brake system 26 can, in various embodiments, include friction brakes, brake by wire, a regenerative braking system such as an electric machine, and/or other appropriate braking systems.

The steering system 24 influences a position of the front wheels 16 and/or the rear wheels 18. While depicted as including a steering wheel 25, in some implementations of the present disclosure, the steering system 24 might not include a steering wheel.

The sensor system 28 includes one or more sensing devices 40a-40n that sense observable conditions of the exterior environment and/or the interior environment of the autonomous vehicle 10. The sensing devices 40a-40n can include, and are not limited to, radars, LIDARs, a GPS sensor, optical cameras, thermal cameras, ultrasonic sensors, a speedometer, a compass, an accelerometer, and/or other sensors. The actuator system 30 includes one or more actuator devices 42a-42n that control one or more vehicle features such as, and not limited to, the propulsion system 20, the transmission system 22, the steering system 24, and the brake system 26. In various embodiments, the autonomous vehicle 10 can also include interior and/or exterior vehicle features not illustrated in FIG. 3, such as various doors, a trunk, and cabin features such as air conditioning, music players, lighting, touch-screen display components (such as those used in connection with navigation systems), and the like.

The data storage device 32 stores data to control the AV 10. In various embodiments, the data storage device 32 stores defined maps of the navigable environment. In various embodiments, the defined maps are predefined by and obtained from a remote system. For example, the defined maps can be assembled by the remote system and communicated to the autonomous vehicle 10 (wirelessly and/or in a wired manner) and stored in the data storage device 32. Route information can also be stored within the data storage device 32—i.e., a set of road segments (associated geographically with one or more of the defined maps) that together define a route the vehicle can take to travel from a start location (e.g., the vehicle's current location) to a target location. Also, in various implementations, the data storage device 32 stores vehicle signal detection software 38 that, when executed by one or more processors, implements methods described herein. As will be appreciated, the data storage device 32 can be part of the controller 34, separate from the controller 34, or part of the controller 34 and part of a separate system.

The controller 34 includes a processor 44 and a computer-readable storage device or media 46. The processor 44 can be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The processor 44 can include one or more processors 44 to cooperate and execute instructions. The computer-readable storage device or media 46 can include volatile and nonvolatile storage in read-only memory (ROM), random-access memory (RAM), and keep-alive memory (KAM), for example. KAM is a persistent or nonvolatile memory that can store various operating variables while the processor 44 is powered down. The computer-readable storage device or media 46 can be implemented using any of a number of known memory devices such as PROMs (programmable read-only memory), EPROMs (electrically PROM), EEPROMs (electrically erasable PROM), flash memory, or any other electric, magnetic, optical, resistive, or combination memory devices for storing data, some of which represent executable instructions, used by the controller 34 in controlling the AV 10.

The instructions can encode/include one or more separate programs that include an ordered listing for implementing logical functions. The instructions, when executed by the processor 44, receive and process signals from the sensor system 28, perform logic, calculations, methods and/or algorithms for controlling the components of the AV 10, and generate control signals transmitted to the actuator system 30 to control the components of the AV 10 based on the logic, calculations, methods, and/or algorithms. Although FIG. 3 shows a controller 34, implementations of the AV 10 can include any number of controllers 34 that communicate over any suitable communication medium or a combination of communication media and that cooperate to process the sensor signals, perform logic, calculations, methods, and/or algorithms, and generate control signals to control features of the AV 10. In one implementation, as discussed in detail below, the controller 34 can perform multi-modal and/or multi-technique vehicle signal detection.

The communication system 36 wirelessly communicates information to and from other entities 48, such as, and not limited to, other vehicles ("V2V" communication), infrastructure ("V2I" communication), remote transportation systems, and/or user devices. In an example, the communication system 36 is a wireless communication system that communicates via a wireless local area network (WLAN) using IEEE (Institute of Electrical and Electronics Engineers) 802.11 standards or by using cellular data communication. Additional or alternate communication methods, such as a dedicated short-range communications (DSRC) channel, are also within the scope of the present disclosure. DSRC channels refer to one-way or two-way short-range to medium-range wireless communication channels for automotive use and a corresponding set of protocols and standards.

Vehicle signal detection software 38 includes instructions for performing a multi-modal and/or multi-technique vehicle signal detection, as previously illustrated by FIGS. 1 and 2.

The controller 34 also includes artificial intelligence module 50 to perform feature detection/classification, obstruction mitigation, route traversal, mapping, sensor integration, ground-truth determination, and the like. The artificial intelligence module 50 can implement techniques such as decision trees, probabilistic classifiers, naive Bayes classifiers, support vector machine, deep learning, a neural network, a convolutional neural network, a recurrent neural network, random forests, genetic algorithms, and/or reinforcement learning.

Autonomous Driving System

Figure 4:
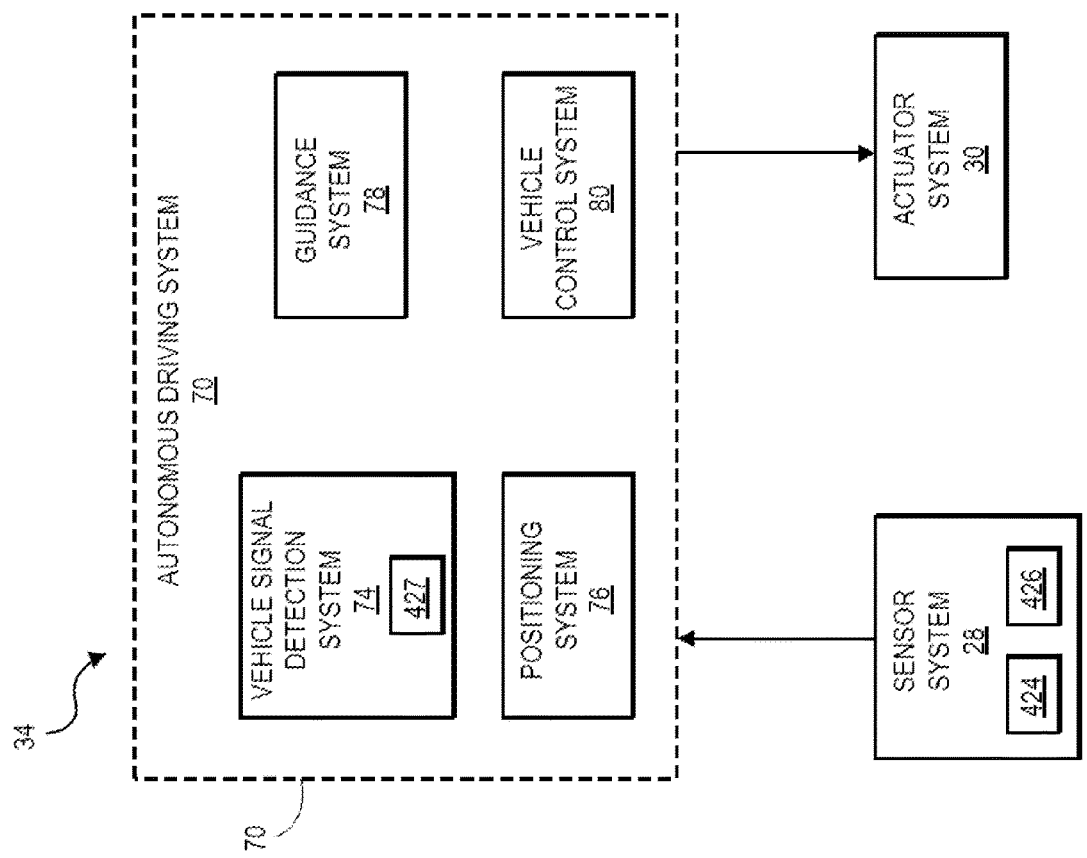
FIG. 4 is a functional block diagram illustrating an autonomous driving system (ADS) associated with an autonomous vehicle, in accordance with various implementations of the present disclosure.

In accordance with various implementations, the controller 34 implements the level four or level five automation system discussed with regard to FIG. 3 as an autonomous driving system (ADS) 70 as shown in FIG. 4.

As shown in FIG. 4, software and/or hardware components of the controller 34 (e.g., processor 44 and computer-readable storage device or media 46) provide the ADS 70.

The autonomous driving system 70 can include a vehicle signal detection system 74, a positioning system 76, a guidance system 78, and a vehicle control system 80. In various implementations, the system can be organized into any number of systems (e.g., combined or further partitioned) as the disclosure is not limited to the present examples.

As shown in FIG. 4, the sensor system 28 can include a camera 424, a depth sensor 426, and any other sensor, such as a speedometer, and a GPS sensor.

In this disclosure and its accompanying claims, the term "camera" should be considered to cover many alternatives, such as a single camera or multiple cameras. A single digital camera can have one image sensor or multiple image sensors. A single camera can have no lenses, a single lens, or multiple lenses. In some implementations, a single camera with multiple lenses has a 360° view (or a nearly 360° view) at a same (or similar) height with no "blind spots" around AV 10.

Multiple cameras can have multiple lenses and/or multiple image sensors. In some cases, the multiple cameras can share a single lens and/or a single image sensor. Multiple image sensors may have different exposure settings. Multiple cameras may have different field of views. Multiple image sensors may have different resolutions. Multiple image sensors may detect different wavelengths of light. Of course, the multiple cameras can also have no lenses. In some implementations, the multiple cameras have a 360° view (or a nearly 360° view) at a same (or similar) height with no "blind spots" around AV 10.

Similarly, the term "depth sensor" should be considered to cover many alternatives, such as one depth sensor, multiple cooperating depth sensors, or multiple independent depth sensors.

Light enters through the camera 424, and an image sensor of the camera 424 converts the light into information of a digital, two-dimensional image. The camera 424 repeatedly captures two-dimensional images of its surrounding environment. In many implementations, the camera 424 also records timestamps at which the two-dimensional images are captured by the image sensor.

The depth sensor 426 can be a radar sensor, a LIDAR sensor, a time of flight sensor, or other sensor for determining distances to objects in the environment around AV 10. In some cases, depth sensor 426 can be implemented with stereo cameras.

In an example in which depth sensor 426 is implemented with a LIDAR sensor, the LIDAR sensor fires rapid pulses of laser light at surfaces of objects (e.g., vehicles, traffic lights) in the environment surrounding the AV 10. The LIDAR sensor measures the amount of time for the laser to travel from the LIDAR sensor to the object, bounce off the surface of the object, and return to the LIDAR sensor. Because light moves at a constant speed, the LIDAR sensor can calculate the distance between the surface of the object and the LIDAR sensor. The LIDAR sensor can provide 360° coverage of laser light around the AV 10.

The system uses the depth sensor 426 to obtain fine details of geometry and position of the object. The vehicle signal detection system 74, specifically the tracker 427 as discussed below, can determine where the back, sides, and top of the object are, based on these details.

The vehicle signal detection system 74 can include, cooperate with, or interface with a tracker 427, which can be implemented in a same or similar fashion as tracker 130 of FIG. 1 and tracker 230 of FIG. 2. The tracker 427 tracks an object by assigning it an identification (e.g., a unique number). In one implementation, the tracker 427 begins tracking an object when it appears in consecutive frames from the camera 424. The tracked object can be any real-world object. For the purposes of the present disclosure, the object is assumed to be an object (such as a traffic light or another vehicle) that has lights with standard meanings. The tracker 427 may classify the tracked object as a vehicle, or not a vehicle. The tracker 427 may classify the tracked object as a specific type of vehicle.

The tracker 427 determines a location of the tracked object relative to the autonomous vehicle 10, using the depth sensor 426 and the camera 424. In addition, the tracker 427 can determine changes in position, velocity, and acceleration, using the depth sensor 426 and the camera 424. Thus, the vehicle signal detection system 74 can determine the presence, location, classification, and/or path of objects and features of the environment of the autonomous vehicle 10, based on the changes in position, velocity, and acceleration determined by the tracker 427. The tracker 427 can form a polygon or box of a tracked object.

The vehicle signal detection system 74 detects light signals of objects within images from sensor system 28, using mechanisms illustrated in FIGS. 1 and 2. The vehicle signal detection system 74 can also analyze characteristics of the detected light signals, such as whether the light signals are brake lights, turn signals, reverse lights, emergency lights, or school bus lights. That is, the vehicle signal detection system 74 can determine a signal state of another vehicle, such as whether the other vehicle is braking, has its hazard lights on, has its turn signal on, and so on.

The positioning system 76 processes sensor data from the sensor system 28 along with other data to determine a position (e.g., a local position relative to a map, an exact position relative to a lane of a road, a vehicle heading, etc.) and a velocity of the autonomous vehicle 10 (of FIG. 3) relative to the environment.

The guidance system 78 processes sensor data from the sensor system 28 along with other data to determine a path for the autonomous vehicle 10 (of FIG. 3) to follow to a destination.

The vehicle control system 80 generates control signals for controlling the autonomous vehicle 10 (of FIG. 3), e.g., according to the path determined by the guidance system 78.

Thus, the vehicle signal detection system 74 can provide a more efficient and less computationally intensive approach to finding vehicle signals. In some cases, the vehicle signal detection system 74 can provide a more robust approach to finding vehicle signals. Further, the signal state determination by the vehicle signal detection system 74 can improve tracking of other vehicles that are in proximity to the AV 10 and, thus, control of the AV 10 by the vehicle control system 80.

Exemplary implementations of the vehicle signal detection system 74 are illustrated in FIGS. 1, 2, 5-10.

Vehicle Signal Detection System Architecture

Figure 5:
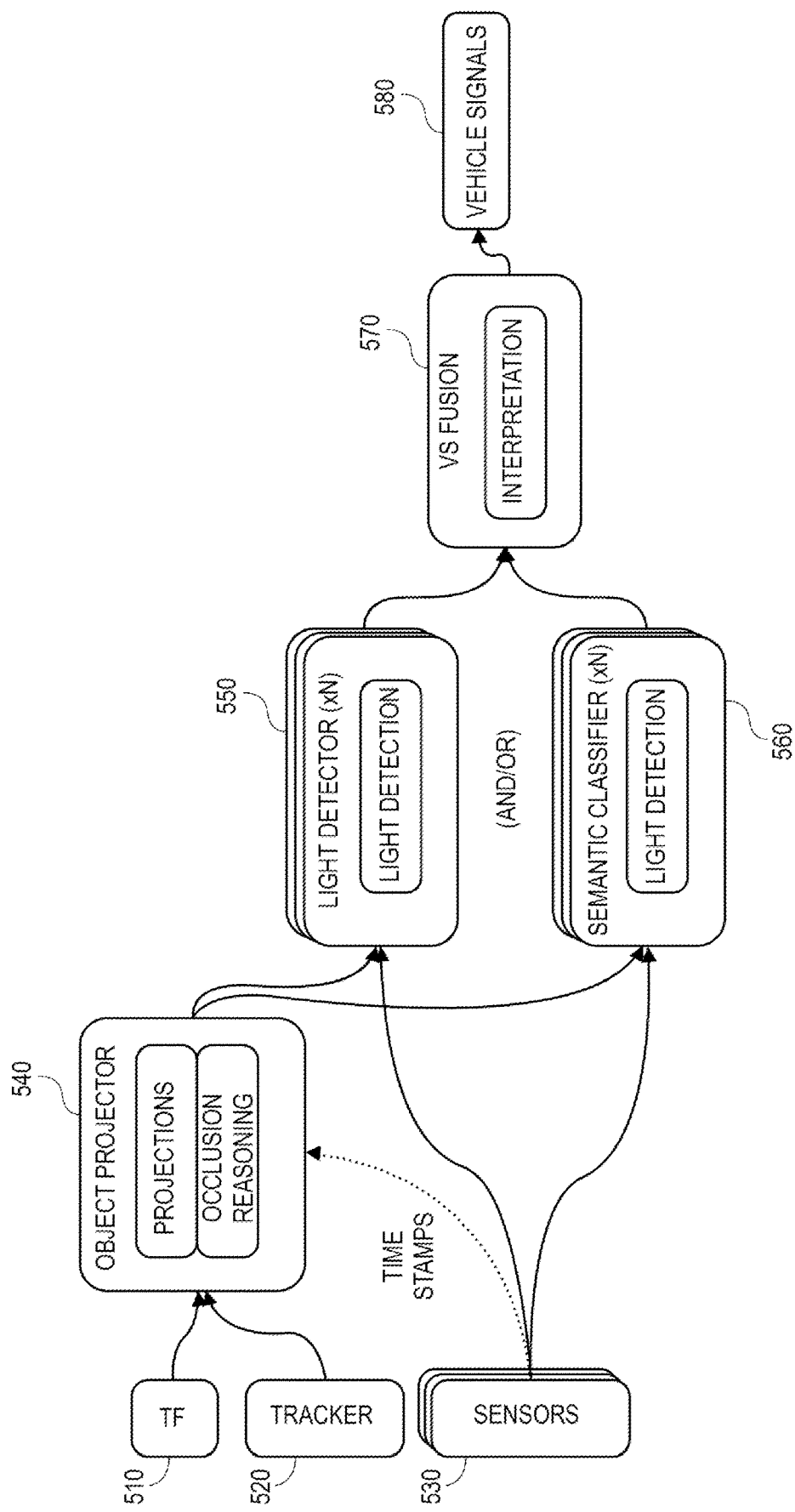
FIG. 5 illustrates a workflow for multi-modal and/or multi-technique vehicle signal detection in accordance with various implementations of the present disclosure.

FIG. 5 illustrates a workflow for multi-modal and/or multi-technique vehicle signal detection in accordance with one implementation of the present disclosure. The workflow includes transforms 510, tracker 520, sensors 530, an object projector 540, a light detector 550 and/or a semantic classifier 560, and a vehicle signal (VS) fusion module 570.

Object projection leverages information relating the coordinate system of the tracker 520 to the coordinate system of the camera, specifically, pixels of images captured by the camera. Generally, the physical or geometric relationship between the coordinate system of the tracker 520 is fixed with respect to the coordinate system of the camera (since the field-of-view of camera is known and fixed within the coordinate system of the tracker 520). Accordingly, transforms 510 can be predetermined, and can encode the relationship using one or more geometric matrix transformations such that coordinates from the tracker 520 can be transformed into a pixel location in a two-dimensional image captured by the camera.

The tracker 520 is the same as or similar to the previously-described tracker 427 (as seen in FIG. 4).

The sensors 530 generally corresponds to sensor system 28 and include the camera 424 and the depth sensor 426 (as seen in FIG. 4).

The object projector 540 receives the transforms 510, three-dimensional coordinates of the object from the tracker 520, and images (and, optionally, timestamps) from the sensors 530. The object projector 540 projects a three-dimensional box representing the object, or a side representing the object, onto a two-dimensional image captured by the camera. The projection can generate a two-dimensional view of the three-dimensional box or the side from the image captured by the camera. Based on the two-dimensional view, a region of interest in the images from the camera can be obtained. In addition, the object projector 540 can in some cases provide occlusion reasoning in the images, relative to occlusions captured by the camera or sensed by the tracker 520. Further, the object projector 540 can crop the images captured by the camera down to the ROIs including the projections of the three-dimensional object onto the images. In some cases, the object projector 540 can apply a mask to the images to remove pixels not associated with a vehicle, or remove pixels not associated with likely regions where vehicle signal lights would be present.

Although the object projector 540 might not be present in some implementations of the disclosure, the object projector 540 can make the search for light signals within the images more efficient by reducing the amount of the pixels to be searched to the cropped ROIs.

As detailed later, the light detector 550 and semantic classifier 560 receive images from the camera of sensors 530 and the projected regions of interest and occlusions from the object projector 540.

The light detector 550 can detect coordinates of a light within the images provided by the camera using geometry. The light detector 550 can crop a portion of the image, based on the ROI. One or more light detectors 550 can be implemented.

The semantic classifier 560 can determine a semantic meaning of the lights detected in the images received from the camera. One or more semantic classifiers 560 can be implemented.

A VS fusion module 570 receives information regarding the detected lights from the light detector 550 and/or the semantic classifier 560.

Further, the VS fusion module 570 receives locations of the lights from the light detector 550 and/or semantic meanings of the lights from the semantic classifier 560.

The VS fusion module 570 include an interpretation module that interprets the locations from the light detector 550 and/or the semantic meanings from the semantic classifier 560 to produce semantically identified vehicle signals 580 within combined images.

Object Projector

In more detail, the object projector 540 receives the transforms 510 and the coordinates of the three-dimensional tracked object from tracker 520. The object projector 540 projects a three-dimensional box representing the tracked object into a two-dimensional image captured by a camera, based on the transforms 510 and coordinates of the three-dimensional coordinates of the tracked object from tracker 520. In some cases, the object projector 540 projects one or more vehicle sides of the three-dimensional polygon, individually.

In one implementation, there is one object projector 540 per camera. A more efficient implementation employs a plurality of cameras (possibly including all cameras) sharing one object projector 540.

The object projector 540 can determine the projection of the object with coarse and/or pixel-wise segmentation. This segmentation can delimit which part of the three-dimensional object is visible to the camera of sensors 530.

Because the tracker 520 tracks information for multiple objects, the object projector 540 can perform occlusion reasoning for the tracked objects. For example, if the object projector 540 determines that a first three-dimensional object is beyond a nearer, second three-dimensional object, the object projector 540 can determine that, e.g., half of the left side of the first three-dimensional object is not visible to the camera.

Thus, the object projector 540 produces a two-dimensional view in the image from the camera of sensors 530, where the object is expected to appear in the image. The two-dimensional view or a derivation of the two-dimensional view can form the ROI in the image. The object projector 540 can also output the three-dimensional box representation of the tracked object to the light detector 550 and/or the semantic classifier 560.

Light Detector: Geometric Observations

As discussed above, the system can include the light detector 550 and/or the semantic classifier 560. The light detector 550 and semantic classifier 560 can receive images from the camera of sensors 530 and the projected regions of interest and occlusions from the object projector 540. The light detector 550 and/or the semantic classifier 560 can also receive from the object projector 540 the three-dimensional box representation of the tracked object. As discussed previously, the light detector 550 geometrically determines coordinates, size, shape, and/or perimeter of a light within images provided by the camera of sensors 530. The semantic classifier 560 determines a semantic meaning of the lights detected in the images received from the camera 424. In some embodiments, the functionalities of the light detector 550 and the semantic classifier 560 may be merged together.

In more detail, the light detector 550 is implemented as a single-frame light detector in some implementations. The light detector 550 receives the image from the camera of sensors 530, and, optionally, an ROI in the image from the object projector 540. The light detector 550 can crop the images down to the ROI and search within the ROI for one or more lights. This search can be performed by artificial intelligence, such as machine learning, deep learning, a neural network, a convolutional neural network (e.g., a ConvNet), a recurrent neural network, random forests, genetic algorithms, and reinforcement learning. The light detector 550 can be trained on images of positions of lights and appearances (e.g., color, size), such as by models of lights on a three-dimensional box. In some implementations, the artificial intelligence can be trained on region and class labels of those images.

The light detector 550 processes fully or partially visible objects within the images. For example, the light detector 550 determines that portions of an image are not part of a tracked object, based on the occlusions. For example, as discussed above, the object projector 540 can determine that half of the left side of a first three-dimensional object is occluded from the camera of sensors 530, due to a second three-dimensional object. In this situation, the light detector 550 can determine that any lights within the half of the left side of the first three-dimensional object do not belong to the first three-dimensional object.

Then, for an object, the light detector 550 computes geometric observations about the lights. These geometric observations can include where the lights are objectively detected in the two-dimensional image, light descriptors (e.g., type, size, color, shape, perimeter, embedded features), and locations where the lights are situated on the vehicle. The light detector 550 can project a light onto a three-dimensional representation of the object, such as the three-dimensional box received from the object projector 540 or a unit cube.

Figure 6:
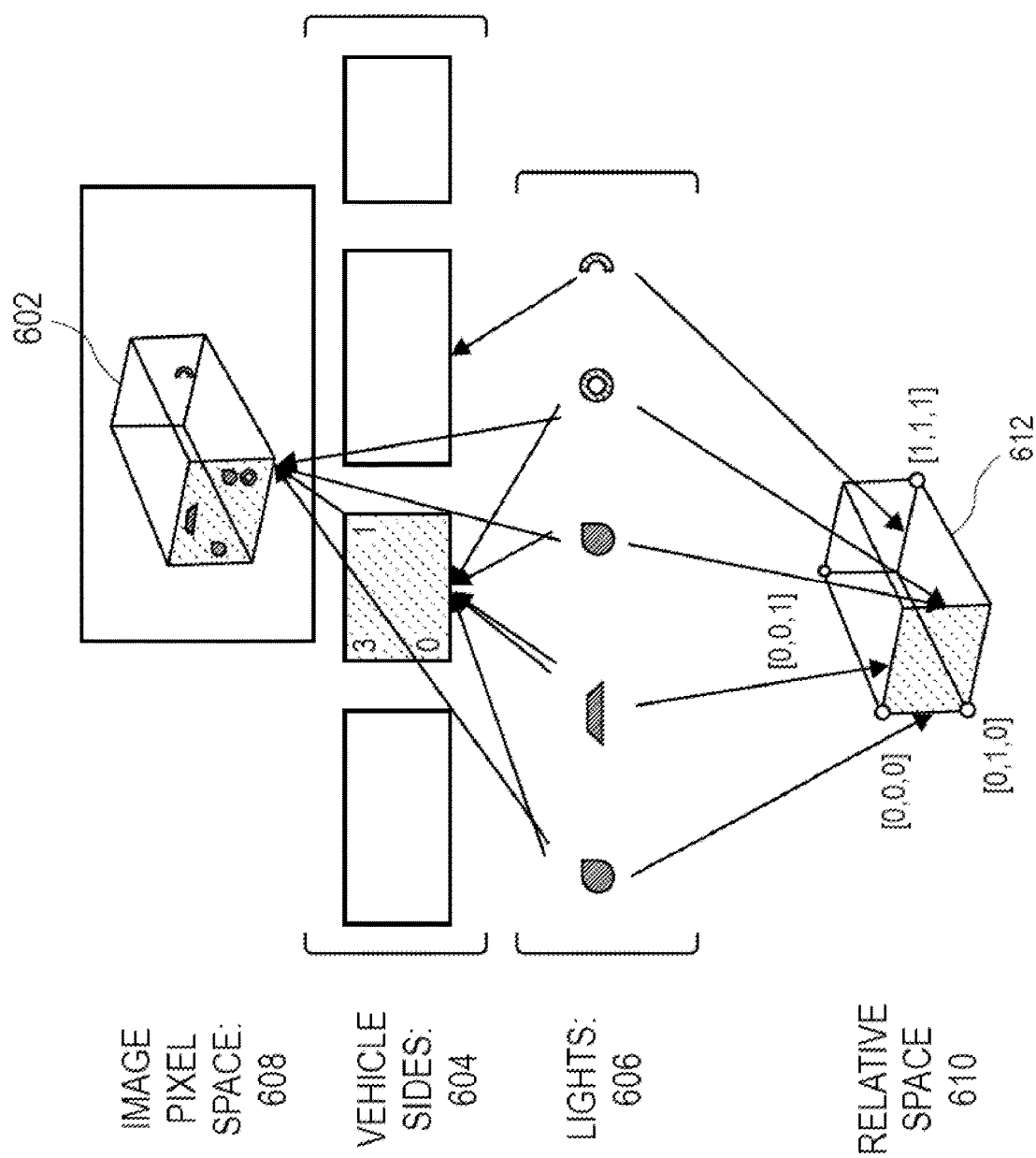
FIG. 6 illustrates a vehicle represented as a three-dimensional box and a mapping of the vehicle's lights.

FIG. 6 illustrates a vehicle represented as a three-dimensional box or polygon 602 and a mapping of its lights. The vehicle is captured by a camera, and the image from the camera is represented by the image pixel space 608.

The light detector 550 has information about the surfaces of the three-dimensional box or polygon 602 as the sides of the vehicle, shown as vehicle sides 604. The three-dimensional box or polygon 602 and the sides of the vehicle can be provided by a tracker. Thus, although the object can have more than four sides (not including the top and bottom in this example), the light detector 550 visualizes the object as having only four vehicle sides 604 in this example. Further, the light detector 550 assumes exactly four corners for each side of the other vehicle.

In implementations with improved modeling, the number of corners per side can exceed four. Implementations also are possible in which the light detector 550 can receive information that models the object as having more than four sides (again, not including the top, or bottom of the object). Further implementations are possible in which the object has six or more sides (including the top and bottom of the object, in the case of flashing lights on a roof of a police car, or underglow, or ground effects on the bottom of a customized car).

Geometrically, the light detector 550 can detect the lights 606 as shown in the image pixel space 608. When the tracker provides information identifying specific vehicle sides 604 of a vehicle to light detector 550, detected lights can be associated to specific vehicle sides 604 (and vice versa) in relative space 610 of FIG. 6.

As shown in the lights 606 of FIG. 6, the light detector 550 can determine the location (e.g., pixel location), size, shape, average intensity (e.g., in lumens), and/or color (e.g., white, yellow, red) of the lights located in the image pixel space 608. The information about the coordinates of the three-dimensional box or polygon 602 and/or coordinates of the vehicle sides 604 can provide regions of interest for the light detector 550 to locate vehicle lights in the image pixel space 608 efficiently.

The light detector 550 can apply image processing or signal processing techniques to determine the location (e.g., pixel location), size, shape, average intensity (e.g., in lumens), and/or color (e.g., white, yellow, red) of the lights located in the image pixel space 608. In some cases, the light detector 550 can apply artificial intelligence to determine the semantic meaning of the lights. This artificial intelligence can be implemented with techniques, such as machine learning, deep learning, a neural network, a convolutional neural network (e.g., a ConvNet), a recurrent neural network, random forests, genetic algorithms, and reinforcement learning.

If desired, the light detector 550 can map the lights to coordinates of a relative space 610 of a unit cube 612, as shown in FIG. 6. That is, the light detector 550 can regress light position information from the image pixel space 608 to relative space 610. In the example illustrated in FIG. 6, the origin of the relative space 610 is the top-left corner of the cube 612. Thus, one example of an output of the light detector 550 could be "circular, 100 cm² amber light on object 12345 at [0.9, 0.8, 0]."

Further, the light detector 550 can skip light detection in an area determined to be occluded by another object.

Semantic Classifier: Semantic Observations

Turning to a semantic light configuration implementation, the semantic classifier 560 performs detection of a high-level light configuration on the tracked object.

The semantic classifier 560 can be trained on images of light configurations, such as "headlights on," "left blinker on," and "no occlusion." Thus, the semantic classifier 560 can output, in one example, a feature vector symbolizing, "This car has its brakes and left turn signals on, and the right side of the car is non-occluded." Other exemplary outputs of the semantic classifier 560 include "left blinker ON," "brakes ON," "left side occluded by other car," "left side occluded by image border," "lights on the right are ON while symmetrically places lights on the left are OFF," and "no occlusion."

In an exemplary operation, the semantic classifier 560 receives the image from the camera of sensors 530 and a region of interest in the image from the object projector 540. The semantic classifier 560 also can crop patches of the image corresponding to, e.g., different vehicles in the image. In some implementations, the semantic classifier 560 can take occlusion into account when forming high-level light detections.

The semantic classifier 560 can apply image processing or signal processing techniques to determine semantic meaning of the lights. In some cases, the semantic classifier 560 can apply artificial intelligence to determine the semantic meaning of the lights. This artificial intelligence can be implemented with techniques, such as machine learning, deep learning, a neural network, a convolutional neural network (e.g., a ConvNet), a recurrent neural network, random forests, genetic algorithms, and reinforcement learning.

VS Fusion

Referring back to FIG. 5, the VS fusion module 570 compares and/or fuses multi-technique interpretations, such as vehicle signal detectors operating on images from multiple cameras, as well as multiple observations from the one or more light detectors 550 and/or one or more semantic classifiers 560. Some multi-technique approaches can include receiving information from multiple light detectors trained on different data sets and/or semantic classifiers trained on different data sets. Thus, the VS fusion module 570 can fuse multiple observations and semantic messages from the semantic classifier 560 and geometric observations from the light detector 550. The fusion of these interpretations can reduce false positives and add redundancy in a system with a single point of failure, such as a single camera.

The VS fusion module 570 generally corresponds to FIG. 2. The VS fusion module 570 can be implemented as one fusion node or, for redundant systems, several fusion nodes.

In some embodiments, the VS fusion module 570 can receive coordinates of a light on a three-dimensional box from the light detector 550 or semantic observations from the semantic classifier 560. The VS fusion module 570 receives, for the tracked object, images from different cameras of sensors 530. The VS fusion module 570 then fuses lights from multiple images onto a unit cube or three-dimensional box for geometric and temporal interpretation (for geometric observations) or embeddings of semantic observation (for semantic observations).

The VS fusion module 570 can also apply temporal signal interpretation to a light to determine, e.g., whether the light is blinking. For example, the VS fusion module 570 can receive several images, at least three images of which show a same light in an illuminated state (e.g., "ON"). The VS fusion module 570 can determine whether the light is blinking, based on timestamps of the several images.

In particular, if the light is blinking, rather than simply being illuminated, the light will be illuminated with periodicity. Thus, the VS fusion module 570 can identify, e.g., five images including the light. If the light is illuminated in the first, third, and fifth images, chronologically, and is not illuminated in the second and fourth images, chronologically, then the VS fusion module 570 can determine the timestamps of the first, third, and fifth images. If the VS fusion module 570 determines the first timestamp differs from the third timestamp by the same amount as the third timestamp differs from the fifth timestamp, then the VS fusion module 570 can determine that the light is blinking at a periodicity approximately equal to the difference in, e.g., the first and third timestamps.

In some implementations, the VS fusion module 570 can determine a frequency of blinking or periodicity of blinking based on geometric observations and/or semantic observations from a series of images.

VS Fusion: Geometric Observation Fusion

Figure 7:
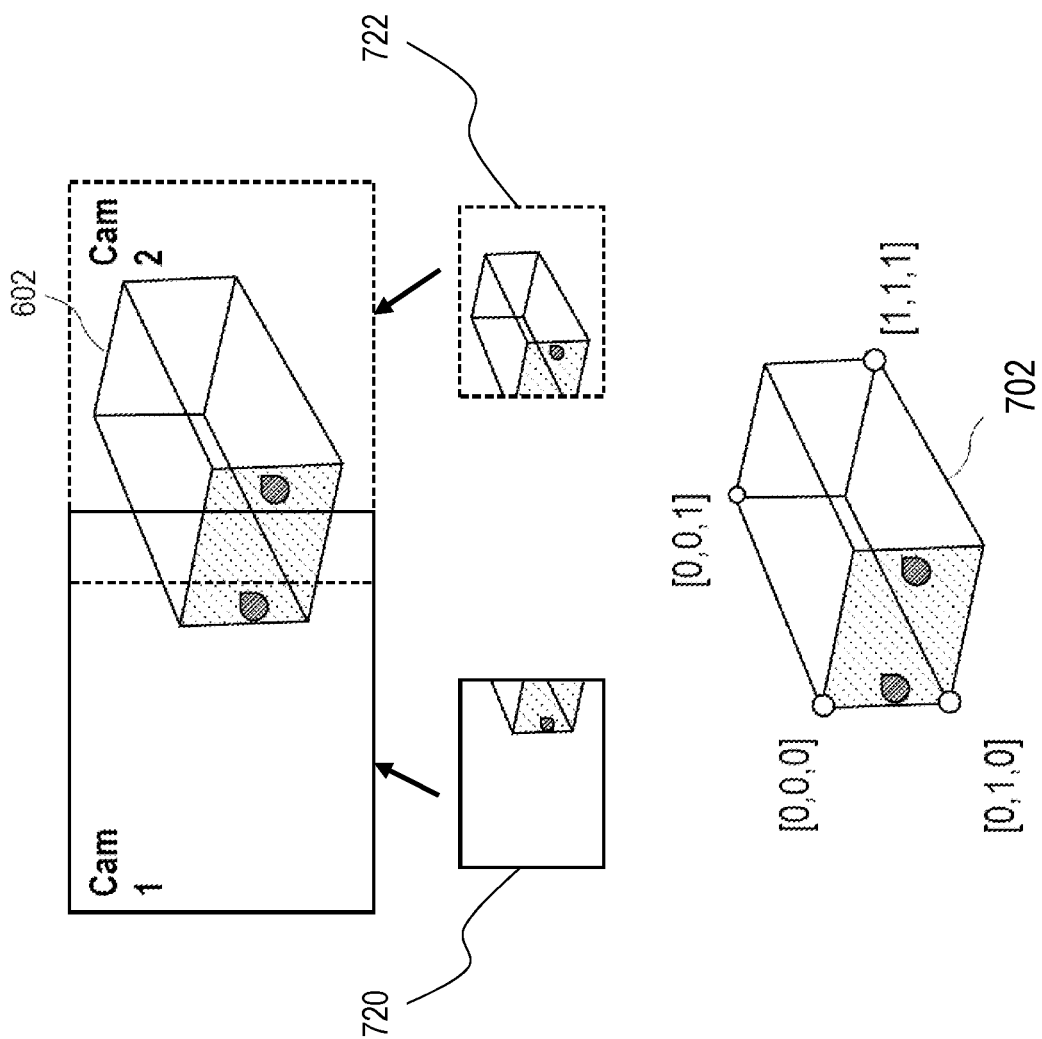
FIG. 7 illustrates a situation in which a left side of a three-dimensional object and a right side of the three-dimensional object are captured in independent images.

A split situation arises if the one camera of sensors 530 captures an image of a left side of a three-dimensional object (e.g., a vehicle represented by polygon 602) and another camera of sensors 530 captures an image of a right side of the same three-dimensional object, as shown in FIG. 7. A similar situation can arise if one camera captures the image of the left side and later captures the image of the right side. Techniques can be used to geometrically associate light detections on the same vehicle, which is represented by the same polygon 602.

In the split situation illustrated in FIG. 7, a left light of the object appears in the two-dimensional image 720 from camera 1, and a right light of the object appears in the two-dimensional image 722 from camera 2.

The light detector 550 can detect the left light in the image from camera 1 and the right light in the image from camera 2. As discussed above, the light detector 550 can detect the left light and associate the left light to a polygon within a relative space (or a three-dimensional box). The same light detector 550 or a different light detector can detect the right light and associate the right light to the same polygon. In some cases, the VS fusion module 570 can associate light detections with a unit cube 702 or a three-dimensional box. As illustrated in the example of FIG. 7, the VS fusion module 570 can receive from the light detector 550 or regress the position information of the left light onto a unit cube 702 with a specific object identifier and the position information of the right light onto the unit cube 702 with the same object identifier.

The VS fusion module 570 can determine the images from cameras 1 and 2 are of the same three-dimensional object, since the left light, and the right light are detected on the same unit cube 702. The VS fusion module 570 can take other information into account, such as based on one or more of: e.g., a tracking identifier of the three-dimensional object, a position of the three-dimensional object, a polygon of the three-dimensional object, or a timestamp of the images from cameras 1 and 2.

The left light and the right light can be at a same or substantially the same height (e.g., within 10 percent of the total height of the object) on the three-dimensional object.

In one example of a geometric observation fusion, the VS fusion module 570 can re-project the two observations onto a three-dimensional model to determine that, for example, two lights of the three-dimensional object are lit. Thus, the light detector 550 can establish a height of a light on a three-dimensional box representation of the three-dimensional object.

VS Fusion: Semantic Observation Fusion

Semantic information associated with a single light at a given point in time is insufficient to determine semantic meaning of vehicle signals. In one example of a semantic observation fusion, the VS fusion module 570 receives information indicating "Left Blinker ON" and information indicating "Right Blinker On". In another example of a semantic observation fusion, the VS fusion module 570 can receive information indicating the image of the left side of a vehicle indicates "Left Blinker ON" and "Right Side Occluded," whereas the image of the right side of the vehicle indicates "Right Blinker ON" and "Left Side Occluded." This information can include the images themselves, three-dimensional coordinates from the light detector, or messages including such semantic information from the semantic classifier.

Thus, the VS fusion module 570 generates semantic labels or an intermediary representation trained on semantic labels. The VS fusion module 570 then generates a final semantic label, such as "Hazards ON Configuration," from the two intermediary semantic representations. The VS fusion module 570 provides this semantic label to, e.g., the vehicle control system 80 to control the autonomous vehicle 10.

Thus, in one implementation, the VS fusion module 570 accumulates observations for the tracked object and for the camera 424. Then, for a tracked object, the VS fusion module 570 can fuse the observations, interpret a static light layout (such as "these lights are together on a vehicle"), and interpret a dynamic semantic (such as "flashing hazards"), based on certain logic for detecting flashing hazards.

The VS fusion module 570 thus semantically produces vehicle signals 580 that can serve as a basis for controlling the vehicle control system 80 to control the AV 10. For example, the AV 10 can be controlled to be braked if a vehicle ahead of the autonomous vehicle 10 has its brake lights on. The AV 10 can also be steered if, for example, the semantic vehicle signals indicate an approaching emergency vehicle. Under appropriate circumstances, the autonomous vehicle 10 can also be accelerated.

Alternative Design Using Pixel or Image Segmentation

Instead of doing occlusion reasoning using the tracker, image segmentation is used. In other words, ROIs, and occlusion reasoning are determined solely based on the images captured by the cameras.

In an alternative design, the occlusion reasoning assisted by tracker is removed from the object projector 540 and instead receives pixel or image segmentation. Such segmentation informs the system whether a light is occluded or not. For example, the segmentation can indicate whether a light is on the three-dimensional object, whether the light is a background light (e.g., on a second car in an image of a first car) or is a reflected light, and whether there is transparency in front of the light (e.g., a traffic light viewed through the window of another vehicle). The image segmentation can remove the background.

Summary of Selected Features

In one implementation, a body of the autonomous vehicle 10 (of FIG. 3) includes a plurality of cameras that record a plurality of images of an environment around the autonomous vehicle 10. The autonomous vehicle 10 performs a target localization using radar or LIDAR sensors. Thus, the autonomous vehicle 10 can identify and track a location of an object in three-dimensional space. The object projector 540 receives the identity of the tracked object and can project where and how the three-dimensional object will enter the field-of-view of the plurality of cameras and, thus, will appear in the images.

The object projector 540 can determine an ROI in the images received from the plurality of cameras. In one implementation, the light detector 550 locates the lights within the ROI, rendering the processing of a semantic labelling potentially unnecessary.

The light detector 550 outputs the location of the lights to a VS fusion module 570. The semantic classifier 560 outputs semantic information of lights to the VS fusion module 570. The VS fusion module 570 can detect vehicle signals by fusing information from one or more light detectors 550 and one or more semantic classifiers 560.

Thus, the autonomous vehicle 10 can be improved by detecting signals on nearby vehicles (e.g., no signal, brakes, turn signals (left/right), hazards, reversing lights, flashing yellow school bus lights (pre-boarding), flashing red school bus lights (boarding), emergency lights such as police, firetrucks, ambulances, and other vehicle lights, such as construction vehicles, garbage trucks, and meter maids).

Thus, the disclosed architecture can merge partial observations across cameras while allowing a different technique being applied to images from different cameras. In some implementations, the VS fusion module 570 fuses observations from different camera/techniques into a light configuration before a temporal interpretation.

Exemplary Vehicle Signal Fusion

Figure 8:
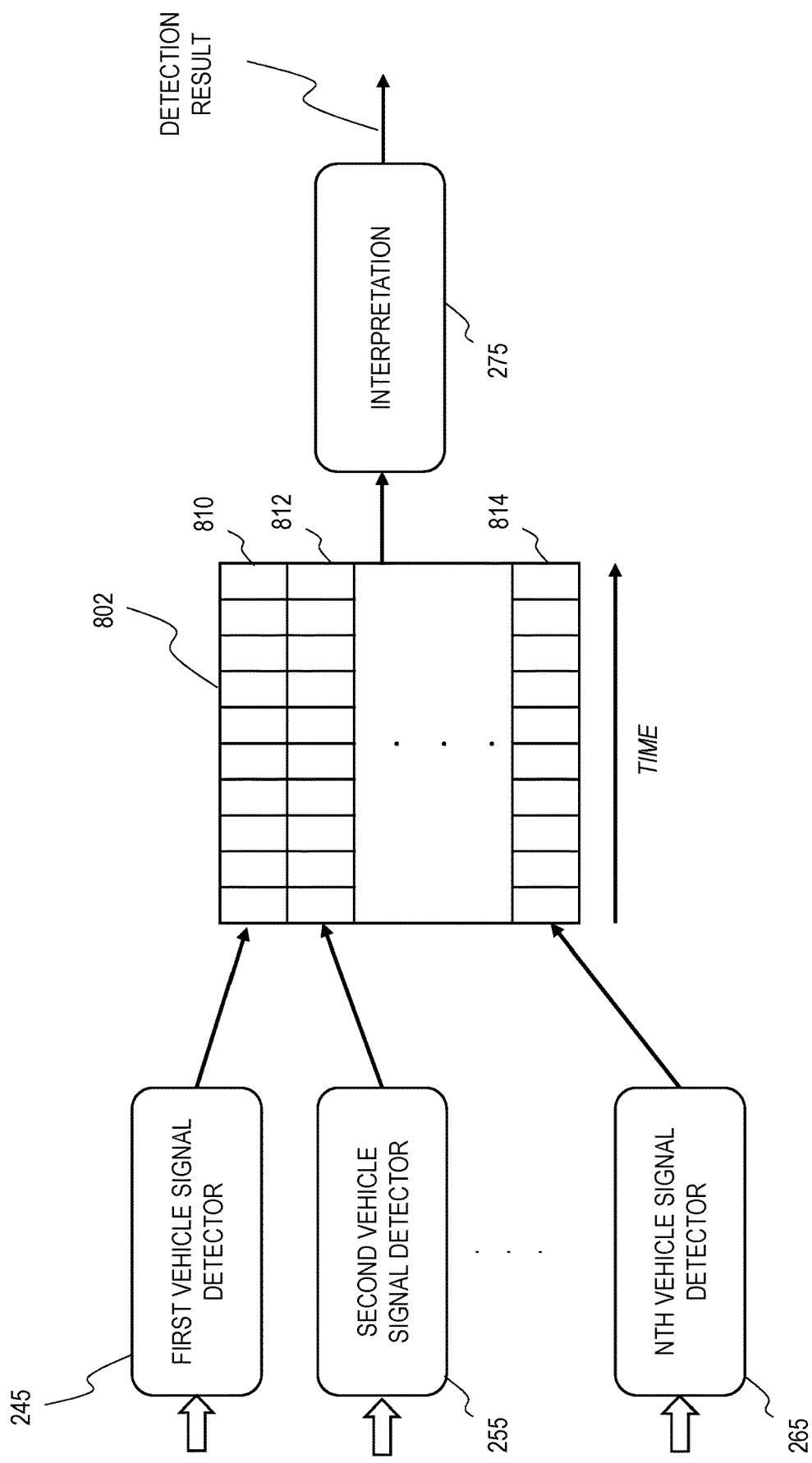
FIG. 8 illustrates interpretation of detection results from a plurality of vehicle signal detectors in accordance with various implementations of the present disclosure.

FIG. 8 illustrates interpretation of detection results from a plurality of vehicle signal detectors in accordance with various implementations of the present disclosure. As described previously, the vehicle signal detectors, such as first vehicle signal detector 245, second vehicle signal detector 255, and Nth vehicle signal detector 265, can generate information, including one or more of: light detection results and semantic information of lights. The light detection results and/or semantic information of lights can be collected over time. Each vehicle signal detector can generate a vector of information over time, e.g., as time-series data. For example, first vehicle signal detector 245 can generate vector 810 of information over time, second vehicle signal detector 255 can generate vector 812 of information over time, and Nth vehicle signal detector 265 can generate vector 814 of information over time. All the vectors collated together can, over time, form a matrix 802 of information. The matrix 802 of information can be provided as input to an interpretation module 275.

In some cases, the interpretation module 275 may apply filter(s) or feature extraction schemes to the matrix 802 or a portion of matrix 802 to transform the information into features that can assist in fusion of information from a plurality of vehicle signal detectors. For instance, the interpretation module 275 may extract frequency information.

In some cases, the interpretation module 275 can implement explicit logic rules for interpreting the information in matrix 802. In some cases, the interpretation module 275 may implement artificial intelligence techniques such as decision trees, probabilistic classifiers, naive Bayes classifiers, support vector machine, deep learning, a neural network, a convolutional neural network, a recurrent neural network, random forests, genetic algorithms, and/or reinforcement learning. The interpretation module 275 can implement supervised or unsupervised learning.

Exemplary Methods and Modifications

Figure 9:
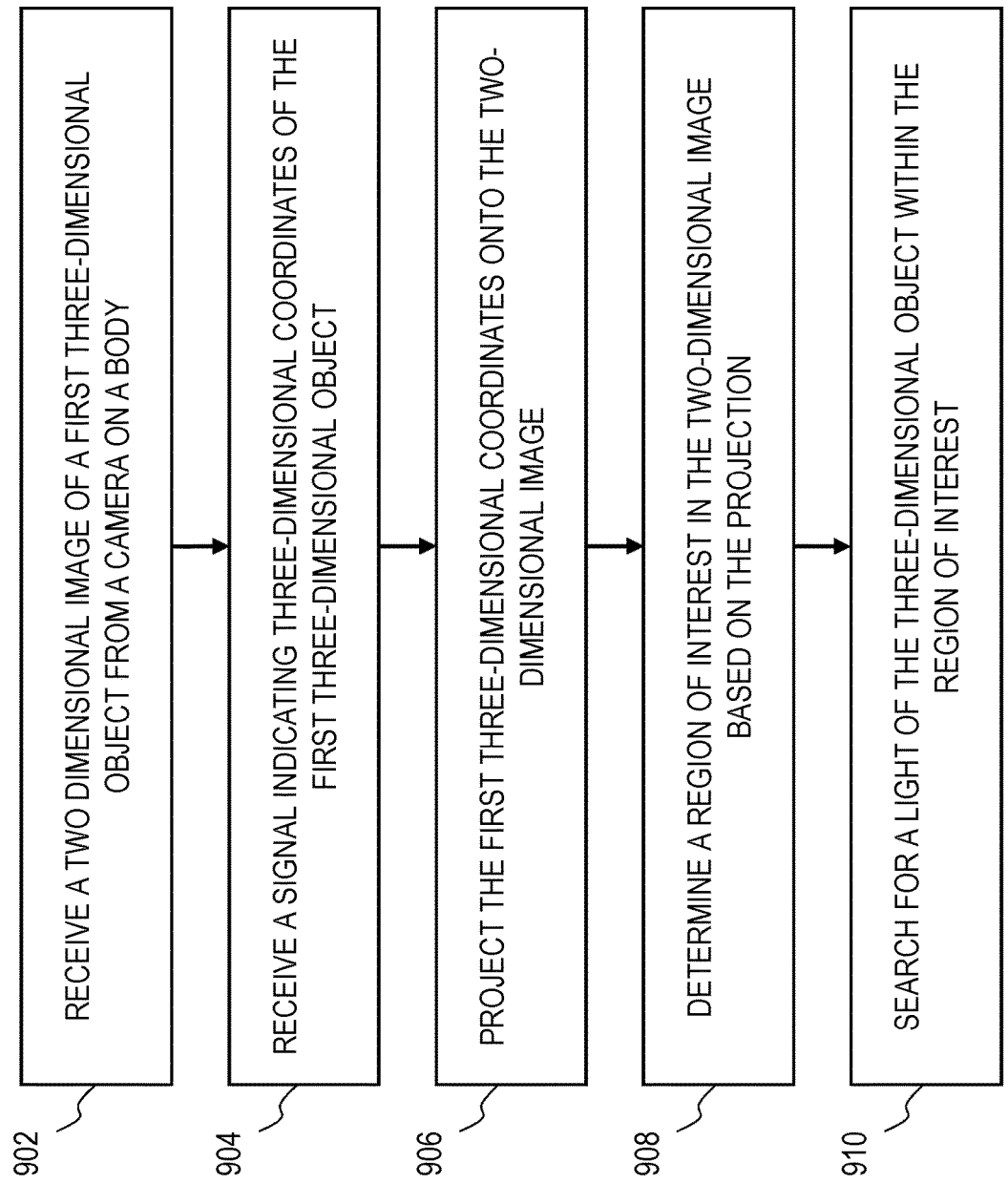
FIG. 9 illustrates a method for multi-modal object projection in accordance with various implementations of the present disclosure.
Figure 10:
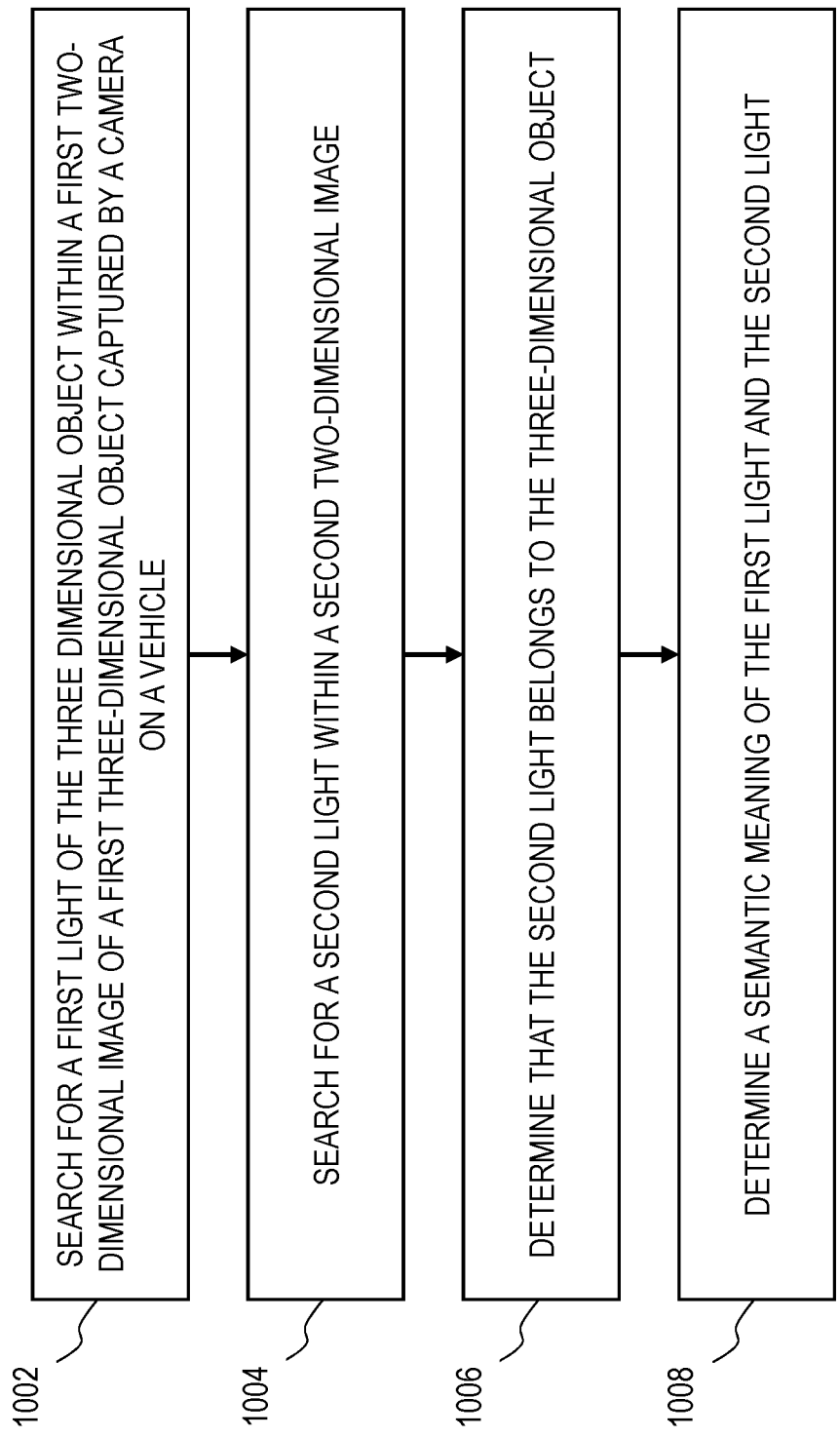
FIG. 10 illustrates a method for multi-technique vehicle signal detection in accordance with various implementations of the present disclosure.

FIG. 9 illustrates a method for multi-modal object projection in accordance with various implementations of the present disclosure. In 902, an object projector receives a two-dimensional image of a first three-dimensional object from a camera on a body. In 904, the object projector receives a first signal indicating first three-dimensional coordinates of the first three-dimensional object. In 904, the object projector projects the first three-dimensional coordinates onto the two-dimensional image. In 906, the object projector determines a region of interest in the two-dimensional image based on the projection. In 908, a light detector, or a semantic classifier searches for a light of the three-dimensional object within the region of interest. The method is illustrated by the description of FIGS. 1, 5, and 6, FIG. 10 illustrates a method for multi-technique vehicle signal detection in accordance with various implementations of the present disclosure. In 1002, a vehicle signal detector searches for a first light of the three-dimensional object within the first two-dimensional image. In 1004, the vehicle signal detector searches for a second light within the second two-dimensional image. The first two-dimensional image and the second two-dimensional image can be different images. The first two-dimensional image and the second two-dimensional image can be the same image. Techniques used to search for the first light and the second light can be different. Techniques used to search for the first light and the second light can be the same. In 1006, the vehicle signal detector determines that the second light belongs to the three-dimensional object. In 1008, the vehicle signal detector determines a semantic meaning of the first light and the second light. The method is illustrated by the description of FIGS. 2, 5, 7, and 8.

Implementations of the present disclosure are directed to searching for vehicle signals. The teachings of the disclosure are not so limited, and those teachings can also be applied to searching for emergency signals on emergency vehicles, traffic lights, and any other light encountered while driving.

Once the vehicle signal(s) is detected, the vehicle control system 80 can take action, based on detected vehicle signal(s). For example, the vehicle control system 80 can control the AV 10 to brake, if the three-dimensional object is ahead of the AV and the three-dimensional object's brake lights are on. The vehicle control system 80 can steer the AV 10 to the side of a road, if the vehicle signals of an emergency vehicle ahead of the autonomous vehicle 10 is detected. The vehicle control system 80 can accelerate the AV 10, if the three-dimensional object's headlights are approaching perpendicular to the body of the autonomous vehicle 10 and is thus about to strike the autonomous vehicle 10.

Computing System

Figure 11:
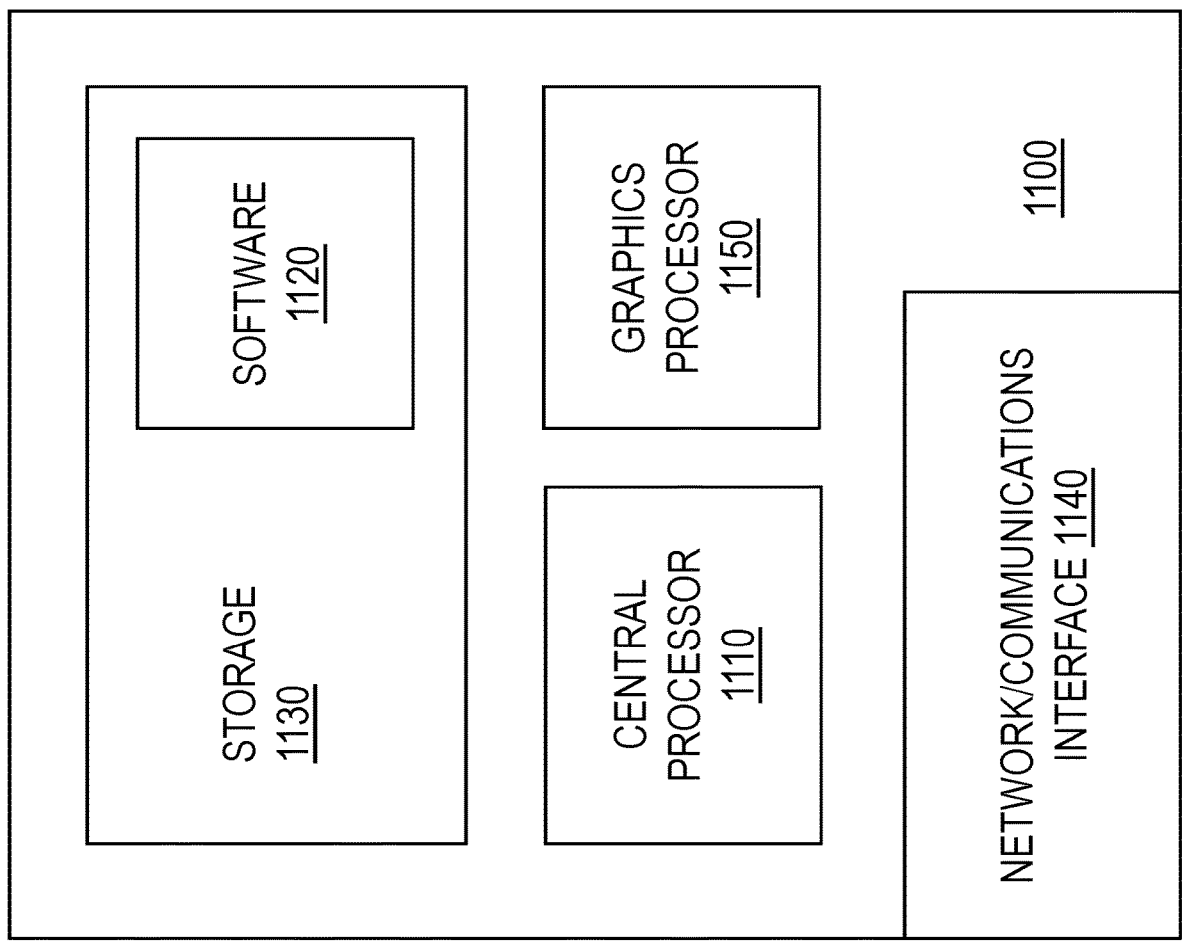
FIG. 11 illustrates components of a computing system used in various implementations of the present disclosure.

FIG. 11 illustrates components of a computing system used in implementations described herein. Specifically, the components of FIG. 10 can be present in the AV 10.

System 1100 can be implemented within one computing device or distributed across multiple computing devices or sub-systems that cooperate in executing program instructions. In some implementations, the system 1100 can include one or more blade server devices, standalone server devices, personal computers, routers, hubs, switches, bridges, firewall devices, intrusion detection devices, mainframe computers, network-attached storage devices, smartphones and other mobile telephones, and other types of computing devices. The system hardware can be configured according to any computer architecture, such as a Symmetric Multi-Processing (SMP) architecture or a Non-Uniform Memory Access (NUMA) architecture.

The system 1100 can include one or more central processors 1110, which can include one or more hardware processors and/or other circuitry that retrieve and execute software 1120 from the storage 1130. The one or more central processors 1110 can be implemented within one processing device, chip, or package, and can also be distributed across multiple processing devices, chips, packages, or sub-systems that cooperate in executing program instructions. In one implementation, the system 1100 includes the one or more central processors 1110 and a GPU 1150. The GPU 1150 can benefit the visual/image processing in the computing system 1100. The GPU 1150, or any second-order processing element independent from the one or more central processors 1110 dedicated to processing imagery and other perception data in real or near real-time, can provide a significant benefit.

The storage 1130 can include one or more computer-readable storage media readable by the one or more central processors 1110 and that store software 1120. The storage 1130 can be implemented as one storage device and can also be implemented across multiple co-located or distributed storage devices or sub-systems. The storage 1130 can include additional elements, such as a controller, that communicate with the one or more central processors 1110. The storage 1130 can also include storage devices and/or sub-systems on which data and/or instructions are stored. The system 1100 can access one or more storage resources to access information to carry out any of the processes indicated by the software 1120.

The software 1120, including routines for at least partially performing at least one of the processes illustrated in the FIGURES, can be implemented in program instructions. Further, the software 1120, when executed by the system 1100 in general or the one or more central processors 1110, can direct, among other functions, the system 1100, or the one or more central processors 1110 to perform the vehicle signal detection as described herein.

In implementations where the system 1100 includes multiple computing devices, a server of the system or, in a serverless implementation, a peer can use one or more communications networks that facilitate communication among the computing devices. For example, the one or more communications networks can include or be a local or wide area network that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

The system 1100 can include a communications interface 1040 that provides one or more communication connections and/or one or more devices that allow for communication between the system 1100 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As used herein, the terms "storage media," "computer-readable storage media," or "computer-readable storage medium" can refer to non-transitory storage media, such as a hard drive, a memory chip, and cache memory, and to transitory storage media, such as carrier waves, or propagating signals.

Aspects of the perception system for an autonomous vehicle can be embodied in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations, and portions of the operations of the methods described can be performed by different processing units. Furthermore, aspects of the present disclosure can take the form of a computer program product embodied in one or more computer-readable media having computer-readable program code embodied, e.g., encoded, or stored, thereon. In various implementations, such a computer program can, for example, be downloaded (or updated) to existing devices and systems or be stored upon manufacturing of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate a suitable combination of features from two or more drawings.

The disclosure describes various illustrative implementations and examples for implementing the features and functionality of the present disclosure. While components, arrangements, and/or features are described in connection with various example implementations, these are merely examples to simplify the present disclosure and are not intended to be limiting. In the development of any actual implementation, numerous implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

In the Specification, reference was made to the spatial relationships between various components and to the spatial orientation of various aspects of components as depicted in the attached drawings. The devices, components, members, and apparatuses described can be positioned in any orientation. Thus, the use of terms such as "above", "below", "upper", "lower", "top", "bottom", or other similar terms to describe a spatial relationship between various components or to describe the spatial orientation of aspects of such components, describes a relative relationship between the components or a spatial orientation of aspects of such components, respectively, as the components described can be oriented in any direction. When used to describe a range of dimensions or other characteristics (e.g., time, pressure, temperature, length, width, etc.) of an element, operations, and/or conditions, the phrase "between X and Y" represents a range that includes X and Y. The systems, methods, and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein, and not other objects or advantages as may be taught or suggested herein.

In one example implementation, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, computer designs, etc. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the FIGS. can be implemented as standalone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions that can be provided on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), and other semiconductor chips.

The specifications, dimensions, and relationships outlined herein (e.g., the number of processors and logic operations) have been offered for non-limiting purposes of example and teaching. Such information can be varied considerably. For example, various modifications, and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the FIGS. can be combined in various possible configurations that are clearly within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations.

The functions related to multi-modal and/or multi-technique vehicle signal detection, e.g. those summarized in the one or more processes shown in the FIGURES, illustrate some of the possible functions that can be executed by, or within, the autonomous vehicle illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

SELECTED EXAMPLES

Example 1 is a method comprising: receiving a two-dimensional image of a first three-dimensional object from a camera on a body; receiving a first signal indicating first three-dimensional coordinates of the first three-dimensional object; projecting the first three-dimensional coordinates onto the two-dimensional image; determining a region of interest in the two-dimensional image based on the projection; and searching for a light of the three-dimensional object within the region of interest.

In Example 2, the method of Example 1 can optionally include projecting the first three-dimensional coordinates onto the two-dimensional image comprising applying a matrix transformation to the three-dimensional coordinates.

In Example 3, the method of Example 1 or 2 can optionally include controlling a vehicle, based on the light of the three-dimensional object, wherein the controlling is accelerating, braking, or steering the vehicle.

In Example 4, the method of any one of Examples 1-3 can optionally include: receiving a second signal indicating second three-dimensional coordinates of a second three-dimensional object; and determining a portion of the first three-dimensional object is occluded in the two-dimensional image by the second three-dimensional object, based on the first three-dimensional coordinates of the first three-dimensional object, and the second three-dimensional coordinates of the second three-dimensional object.

In Example 5, the method of claim any one of Examples 1-4 can optionally include projecting the first three-dimensional coordinates comprising: projecting a surface of a three-dimensional polygon corresponding to the first three-dimensional object.

In Example 6, the method of any one of Examples 1-5 can optionally include: the signal indicating the three-dimensional coordinates of the first three-dimensional object including three-dimensional coordinates of a plurality of surfaces of the first three-dimensional object, and the region of interest being determined based on the three-dimensional coordinates of the plurality of surfaces of the first three-dimensional object.

In Example 7, the method of any one of Examples 1-6 can optionally include: cropping the two-dimensional image to the region of interest to produce a cropped image, wherein the searching is performed on the cropped image.

Example 8 is a system comprising: a memory including instructions, a processor to execute the instructions, and an object projector encoded in the instructions to: receive a two-dimensional image of a first three-dimensional object from a camera on a body; receive a first signal indicating first three-dimensional coordinates of the first three-dimensional object; project the first three-dimensional coordinates onto the two-dimensional image; determine a region of interest in the two-dimensional image based on the projection; and search for a light of the three-dimensional object within the region of interest.

In Example 9, the system of Example 8 can optionally include projecting the first three-dimensional coordinates onto the two-dimensional image comprising applying a matrix transformation to the three-dimensional coordinates.

In Example 10, the system of Example 8 or 9 can optionally include a vehicle control system to accelerate, brake, or steer a vehicle, based on the light of the three-dimensional object.

Example 11 is a method comprising: searching for a first light of a three-dimensional object within a first two-dimensional image of the three-dimensional object captured by a camera on a vehicle; searching for a second light within a second two-dimensional image; determining that the second light belongs to the three-dimensional object; and determining a semantic meaning of the first light and the second light.

In Example 12, the method of Example 11 can optionally include controlling the vehicle, based on the semantic meaning of the first light and the second light, wherein the controlling is accelerating, braking, or steering the vehicle.

In Example 13, the method of Example 11 or 12 can optionally include: determining a first location of the first light on the three-dimensional object and a first color of the first light in the first two-dimensional image, wherein the semantic meaning is based on the first location and the first color.

In Example 14, the method of Example 13 can optionally include: projecting the first light onto a first represented location of the three-dimensional representation of the three-dimensional object, based on the first location; determining a second location of the second light on the three-dimensional object and a second color of the second light in the second two-dimensional image; and projecting the second light onto a second represented location of the three-dimensional representation of the three-dimensional object, based on the second location, wherein the semantic meaning is based on the first represented location, the second represented location, the first color, and the second color.

In Example 15, the method of any one of Examples 11-14 can optionally include: determining a first semantic meaning of the first light; and determining a second semantic meaning of the second light, wherein the semantic meaning is based on the first semantic meaning and the second semantic meaning.

In Example 16, the method of any one of Examples 11-15 can optionally include: receiving a first timestamp of a time at which the first two-dimensional image was captured by the camera; receiving a second timestamp of a time at which the second two-dimensional image was captured; and determining that a light of the three-dimensional object is blinking, based on the first timestamp and the second timestamp, wherein the semantic meaning is based on the determining that the light is blinking.

In Example 17, the method of any one of Examples 11-16 can optionally include the semantic meaning being based on a first color of the first light in the first two-dimensional image and a second color of the second light in the second two-dimensional image.

Example A is a vehicle comprising: a memory including instructions; a processor to execute the instructions; a body including a camera; and a vehicle signal detector encoded in the instructions to: implement any one or more of Examples 1-7, 11-17, and methods described herein.

Example B is one or more non-transitory, computer-readable media encoded with instructions that, when executed by one or more processing units, perform a method according to any one or more of Examples 1-7, 11-17, and methods described herein.

Example C is an apparatus that includes means to implement and/or carry out any one of the Examples herein.

Various implementations can combine features of Examples herein.

What is claimed is:

1. A method, comprising:
    receiving a two-dimensional image of a first three-dimensional object from a camera, wherein the first three-dimensional object is a vehicle;
    receiving a first signal indicating first three-dimensional coordinates of the first three-dimensional object;
    receiving a second signal indicating second three-dimensional coordinates of a second three-dimensional object;
    projecting the first three-dimensional coordinates onto the two-dimensional image;
    determining a portion of the first three-dimensional object is occluded in the two-dimensional image by the second three-dimensional object, based on the first three-dimensional coordinates of the first three-dimensional object, and the second three-dimensional coordinates of the second three-dimensional object;
    determining a region of interest in the two-dimensional image based on the projection; and
    searching for a vehicle signal light of the first three-dimensional object within the region of interest.

2. The method of claim 1, wherein projecting the first three-dimensional coordinates onto the two-dimensional image comprises applying a matrix transformation to the first three-dimensional coordinates.

3. The method of claim 1, further comprising:
    controlling a vehicle, based on the vehicle signal light of the first three-dimensional object, wherein the controlling is accelerating, braking, or steering the vehicle.

4. The method of claim 1, further comprising:
    in response to determining the portion of the first three-dimensional object is occluded, applying a mask to the two-dimensional image to remove pixels not associated with regions where vehicle signal lights would be present.

5. The method of claim 1, wherein projecting the first three-dimensional coordinates comprises projecting a surface of a three-dimensional polygon corresponding to the first three-dimensional object.

6. The method of claim 1, wherein the first signal indicating the first three-dimensional coordinates of the first three-dimensional object includes three-dimensional coordinates of a plurality of surfaces of the first three-dimensional object, and the region of interest is determined based on the three-dimensional coordinates of the plurality of surfaces of the first three-dimensional object.

7. The method of claim 1, further comprising:
    cropping the two-dimensional image to the region of interest to produce a cropped image, wherein the searching is performed on the cropped image.

8. One or more non-transitory, computer-readable media encoded with instructions that, when executed by one or more processing units, perform a method comprising:
    receiving a two-dimensional image of a first three-dimensional object from a camera, wherein the first three-dimensional object is a vehicle;
    receiving a first signal indicating first three-dimensional coordinates of the first three-dimensional object;
    receiving a second signal indicating second three-dimensional coordinates of a second three-dimensional object;
    projecting the first three-dimensional coordinates onto the two-dimensional image;
    determining a portion of the first three-dimensional object is occluded in the two-dimensional image by the second three-dimensional object, based on the first three-dimensional coordinates of the first three-dimensional object, and the second three-dimensional coordinates of the second three-dimensional object;
    determining a region of interest in the two-dimensional image based on the projection; and
    searching for a vehicle signal light of the first three-dimensional object within the region of interest.

9. The one or more non-transitory, computer-readable media of claim 8, wherein projecting the first three-dimensional coordinates onto the two-dimensional image comprises applying a matrix transformation to the first three-dimensional coordinates.

10. The one or more non-transitory, computer-readable media of claim 8, the method further comprising:
    controlling a vehicle, based on the vehicle signal light of the first three-dimensional object, wherein the controlling is accelerating, braking, or steering the vehicle.

11. The one or more non-transitory, computer-readable media of claim 8, the method further comprising:
    in response to determining the portion of the first three-dimensional object is occluded, applying a mask to the two-dimensional image to remove pixels not associated with the first three-dimensional object.

12. The one or more non-transitory, computer-readable media of claim 8, wherein projecting the first three-dimensional coordinates comprises projecting a surface of a three-dimensional polygon corresponding to the first three-dimensional object.

13. The one or more non-transitory, computer-readable media of claim 8, wherein the first signal indicating the first three-dimensional coordinates of the first three-dimensional object includes three-dimensional coordinates of a plurality of surfaces of the first three-dimensional object, and the region of interest is determined based on the three-dimensional coordinates of the plurality of surfaces of the first three-dimensional object.

14. The one or more non-transitory, computer-readable media of claim 8, the method further comprising:
cropping the two-dimensional image to the region of interest to produce a cropped image, wherein the searching is performed on the cropped image.

15. A system, comprising:
a memory including instructions;
a processor to execute the instructions; and
an object projector, encoded in the instructions, to:
receive a two-dimensional image of a first three-dimensional object from a camera, wherein the first three-dimensional object is a vehicle;
receive a first signal indicating first three-dimensional coordinates of the first three-dimensional object;
receive a second signal indicating second three-dimensional coordinates of a second three-dimensional object;
project the first three-dimensional coordinates onto the two-dimensional image;
determine a portion of the first three-dimensional object is occluded in the two-dimensional image by the second three-dimensional object, based on the first three-dimensional coordinates of the first three-dimensional object, and the second three-dimensional coordinates of the second three-dimensional object; and
determine a region of interest in the two-dimensional image based on the projection; and
a vehicle signal detector, encoded in the instructions, to:
search for a vehicle signal light of the first three-dimensional object within the region of interest.

16. The system of claim 15, wherein the vehicle signal detector further is to:
skip light detection in the portion of the first three-dimensional object in the two-dimensional image occluded by the second three-dimensional object.

17. The system of claim 15, further comprising:
a vehicle control system to accelerate, brake, or steer a vehicle, based on the vehicle signal light of the first three-dimensional object.

18. The system of claim 15, wherein the vehicle signal detector further is to:
in response to determining the portion of the first three-dimensional object is occluded, determine any lights within the portion of the first three-dimensional object in the two-dimensional image occluded by the second three-dimensional object do not belong to the first three-dimensional object.

19. The system of claim 15, wherein projecting the first three-dimensional coordinates comprises projecting a surface of a three-dimensional polygon corresponding to the first three-dimensional object.

20. The system of claim 15, wherein the first signal indicating the first three-dimensional coordinates of the first three-dimensional object includes three-dimensional coordinates of a plurality of surfaces of the first three-dimensional object, and the region of interest is determined based on the three-dimensional coordinates of the plurality of surfaces of the first three-dimensional object.

* * * * *